United States Patent
Hurd

(10) Patent No.: US 9,439,339 B2
(45) Date of Patent: Sep. 13, 2016

(54) TILLAGE DEVICE FOR AGRICULTURAL MACHINERY OR IMPLEMENTS TO REDUCE COMPACTION CAUSED BY WHEELS IN A FIELD

(71) Applicant: AGRICULTURE CONCEPTS, LLC, Ames, IA (US)

(72) Inventor: Colin Josh Hurd, Ames, IA (US)

(73) Assignee: Agriculture Concepts, LLC, Ames, IA (US)

( * ) Notice: Subject to any disclaimer, the term of this patent is extended or adjusted under 35 U.S.C. 154(b) by 101 days.

(21) Appl. No.: 14/109,588

(22) Filed: Dec. 17, 2013

(65) Prior Publication Data

US 2014/0166321 A1 Jun. 19, 2014

Related U.S. Application Data

(63) Continuation of application No. 61/739,303, filed on Dec. 19, 2012.

(51) Int. Cl.
*A01B 37/00* (2006.01)
*A01B 35/16* (2006.01)
*A01B 49/02* (2006.01)

(52) U.S. Cl.
CPC .............. *A01B 37/00* (2013.01); *A01B 35/16* (2013.01); *A01B 49/02* (2013.01)

(58) Field of Classification Search
CPC ...... A01B 37/00; A01B 21/04; A01B 21/00; A01B 21/02
USPC ....... 172/540, 548, 550, 555, 556, 463, 468, 172/470, 471, 637, 132, 833, 671, 672, 676
See application file for complete search history.

(56) References Cited

U.S. PATENT DOCUMENTS

| | | | | | |
|---|---|---|---|---|---|
| 1,332,643 | A | * | 3/1920 | Thomas | 172/482 |
| 1,609,602 | A | * | 12/1926 | Bissell | 172/591 |
| 1,747,753 | A | * | 2/1930 | Burkhart | 172/468 |
| 1,887,348 | A | * | 11/1932 | Freeman | 172/134 |
| 1,917,944 | A | * | 7/1933 | Langdon | 172/482 |
| 2,134,438 | A | * | 10/1938 | Click | 172/477 |
| 2,224,051 | A | * | 12/1940 | Ihde | 172/138 |
| 2,277,880 | A | * | 3/1942 | Noble | B62D 49/065 172/134 |
| 2,319,899 | A | * | 5/1943 | Silver | 172/134 |
| 2,675,752 | A | * | 4/1954 | Wangsgard | 172/463 |
| 3,621,922 | A | * | 11/1971 | Hinken | A01B 39/26 172/510 |
| 4,192,388 | A | * | 3/1980 | Goebel | 172/463 |
| 4,193,456 | A | * | 3/1980 | Ankenman | 172/272 |
| 4,209,068 | A | * | 6/1980 | Corsentino | 172/572 |
| 4,210,210 | A | * | 7/1980 | Ankenman | 172/272 |

(Continued)

*Primary Examiner* — Matthew D Troutman
(74) *Attorney, Agent, or Firm* — BrownWinick Law Firm; Christopher A. Proskey

(57) ABSTRACT

An attachment for agricultural implements which tills soil compacted by the wheels of the agricultural implement it is attached to. In one arrangement the power and force used to till the soil is gained from the torque of the machine pulling the agricultural implement it is attached to, alternatively the tilling device is independently powered. This arrangement reduces compaction caused by the wheels of row-crop planters through the use of a shank or rolling tines. The tilling device is mounted directly behind wheels of the agricultural implement. The tilling device has the ability to raise and lower into the soil with the engaging and disengaging of the implement. In addition, in its current form it can independently be disengaged from use by raising and locking it up out of the soil, even if the implement remains engaged.

1 Claim, 16 Drawing Sheets

(56) References Cited

U.S. PATENT DOCUMENTS

| | | | | |
|---|---|---|---|---|
| 4,228,861 A * | 10/1980 | Hart | | 172/662 |
| 4,237,985 A * | 12/1980 | Hoefkes | | 172/676 |
| 4,308,921 A * | 1/1982 | Davis | | 172/488 |
| 4,383,580 A | 5/1983 | Huxford | | |
| 4,909,334 A * | 3/1990 | Tanner et al. | | 172/58 |
| 5,645,000 A | 7/1997 | Carroll | | |
| 5,934,382 A * | 8/1999 | Wilkins | | 172/460 |
| 6,554,078 B1 | 4/2003 | McDonald | | |
| 6,854,525 B2 | 2/2005 | Martindale | | |
| 7,172,032 B2 | 2/2007 | McKinley et al. | | |
| 7,624,814 B2 * | 12/2009 | Skolness | A01B 39/08 | 172/551 |
| 7,753,133 B2 * | 7/2010 | Skolness | A01B 35/16 | 172/551 |
| 7,802,631 B2 | 9/2010 | McKinley et al. | | |
| 8,297,372 B2 | 10/2012 | Buckrell et al. | | |
| 8,327,947 B2 | 12/2012 | Martindale et al. | | |
| 8,408,149 B2 * | 4/2013 | Rylander | A01C 7/006 | 111/140 |
| 2007/0175644 A1 * | 8/2007 | Skolness | | 172/540 |
| 2011/0155031 A1 | 6/2011 | Arnett et al. | | |
| 2012/0316736 A1 | 12/2012 | Hubalek et al. | | |

\* cited by examiner

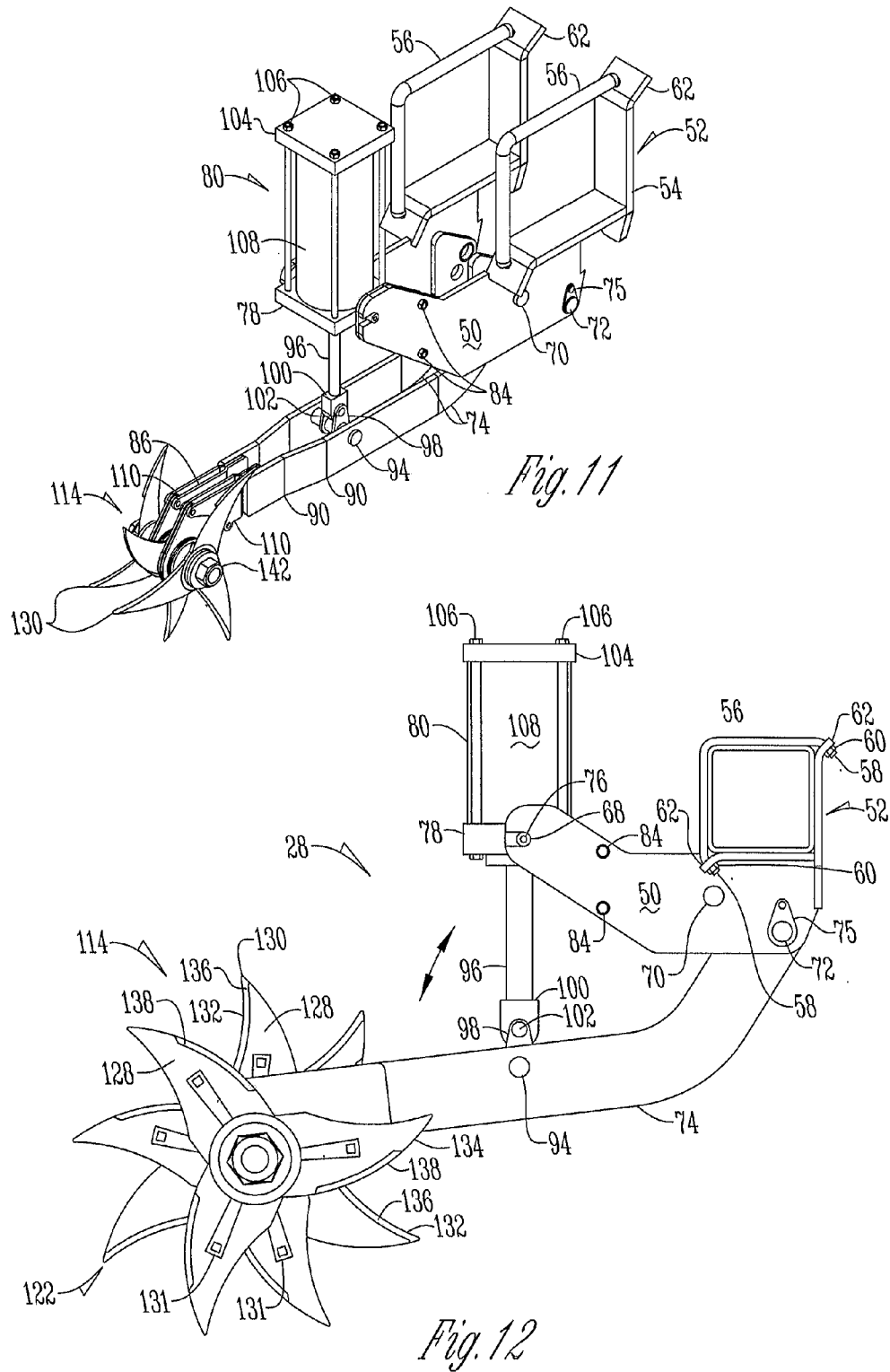

TILLAGE DEVICE FOR AGRICULTURAL MACHINERY OR IMPLEMENTS TO REDUCE COMPACTION CAUSED BY WHEELS IN A FIELD

CROSS REFERENCE TO RELATED APPLICATION

This application claims the benefit of U.S. Provisional Application No. 61/739,303 filed Dec. 19, 2012.

FIELD OF THE INVENTION

This invention relates to agricultural machinery and implements. More specifically, and without limitation, this invention relates to a tillage device for agricultural machinery and implements that reduces the compaction in a field caused by wheels which support the agricultural machinery or implement.

BACKGROUND

Improvements in machinery and technology have drastically changed agricultural practices. As machinery and technology has improved, this has allowed farmers to grow the size of their operations. As the number of acres a farmer must plant, fertilize, spray and harvest increases, so must grow the size and capacity of the farmer's agricultural implements. The term "agricultural implement" used herein generically describes any farming device such as a planters, tractors, sprayers, cultivators, combines, harvesters, spreader, wagons, truck, or any other vehicle or implement of any kind that travels across farm ground and causes compaction.

While the improvements in technology, and the increased size of agricultural implements has allowed farmers to operate more and more land, the increasing size of agricultural implements has its disadvantages. Namely, as the size and capacity of agricultural implements increases, so does the weight of the agricultural implements. As the weight of the agricultural implement increases, so increases the amount of compaction caused by the tires supporting the agricultural implement as it drives through the field. The more compacted the soil becomes, the less farmer's crops yield because compaction prevents plants roots from dispersing through the soil.

This phenomenon is especially apparent with planters. The size of planters has grown substantially over time, from only a couple of rows, to some as large as 48 rows. Not only has the size of the planters substantially increased, but the seed carrying capacity has also substantially increased. While this arrangement allows a farmer to plant a huge amount of land in an extremely efficient manner, the increased weight of the planter plus the large amount of seed it is carrying, causes severe compaction in the field. This compaction comes at an extremely vulnerable time for the crop as the seed has just been planted and must quickly germinate, root, and penetrate the soil otherwise it will perish.

Solutions to this problem have been elusive. A common solution for compaction has traditionally been to till or rip the compacted ground. However, deep tillage or ripping of the soil has traditionally required a tremendous amount of horsepower and/or torque. With the use of modern planters that are large and heavy, the pulling tractor is already taxed to the point where adding features that cause large amounts of additional drag on the planters is extremely undesirable. Furthermore, because in the case of a planter, the seed has just been planted, care must be taken to reduce compaction while not disturbing the placement of the seed, which many forms of traditional tillage may do.

Another solution to the problem of compaction has been to add additional wheels to the agricultural implement to disperse the compaction over a greater area. While adding more wheels resolves some of the compaction, it is extremely expensive and complicated to add additional weight bearing wheels to already complex equipment. In addition, adding wheels causes additional compaction in other areas. As such, the addition of more wheels is no solution at all and in-fact can cause further problems, and can reduce the farmer's yield more than the conventional arrangement where the ground under the implement's wheels is essentially sacrificed.

Another attempted solution to the problem of compaction has been to add tracks to the implement. While tracks effectively spread the weight of the tractor and planter over more area, which reduces compaction it comes at the cost of maneuverability. In addition, transporting machinery with tracks versus wheels, travel speed need to be reduced to avoid excessive vibration and extensive wear. Tracks also have a tendency to greatly disturb and damage the field when the implement is turned at the end rows of the field because the tracks tear or berm the soil. As such, what is often gained from a compaction standpoint is often lost in maneuverability and damage to the field standpoint.

Therefore, for the reasons stated above, and for other reasons stated below, which will become apparent to those skilled in the art upon reading and understanding the specification, and the drawings, there is a need in the art for a tillage device for agricultural machinery or implements to reduce compaction.

Thus, it is a primary object of the invention to provide a tillage device for agricultural machinery or implements that reduces compaction caused by wheels in a field.

Another object of the invention to provide a tillage device for agricultural machinery or implements that reduces compaction that is easy to use.

Yet another object of the invention to provide a tillage device for agricultural machinery or implements that reduces compaction that is can easily be installed on conventional and existing agricultural implements.

Another object of the invention to provide a tillage device for agricultural machinery or implements that reduces compaction that does not substantially interfere with the use or operation of the agricultural machinery or implements.

Yet another object of the invention to provide a tillage device for agricultural machinery or implements that reduces compaction that is robust.

Another object of the invention to provide a tillage device for agricultural machinery or implements that reduces compaction that is simple.

Yet another object of the invention to provide a tillage device for agricultural machinery or implements that reduces compaction that does not greatly increase the amount of drag placed on the agricultural implement or greatly increase the amount of torque or horsepower required to operate the agricultural implement.

Another object of the invention to provide a tillage device for agricultural machinery or implements that reduces compaction that has a simple and intuitive design.

Yet another object of the invention to provide a tillage device for agricultural machinery or implements that reduces compaction that is relatively inexpensive.

Another object of the invention to provide a tillage device for agricultural machinery or implements that reduces compaction that improves plant yield and health.

Yet another object of the invention to provide a tillage device for agricultural machinery or implements that reduces compaction that has a long useful life.

Another object of the invention to provide a tillage device for agricultural machinery or implements that reduces compaction that has a short pay-back period.

Yet another object of the invention to provide a tillage device for agricultural machinery or implements that reduces compaction that has a minimum number of parts.

Another object of the invention to provide a tillage device for agricultural machinery or implements that reduces compaction that can be precisely controlled.

Yet another object of the invention to provide a tillage device for agricultural machinery or implements that reduces compaction that is that is selectively positional between an operable position and an inoperable position.

Another object of the invention to provide a tillage device for agricultural machinery or implements that reduces compaction that reduces or eliminates the effect of implement weight has on compaction.

Yet another object of the invention to provide a tillage device for agricultural machinery or implements that reduces compaction that is a one-pass solution.

These and other objects, features, or advantages of the invention will become apparent from the specification, drawings and claims.

BRIEF SUMMARY OF THE INVENTION

The invention is directed to a tillage system positioned behind the weight-carrying wheels of an agricultural implement or machine. The drawings depict a design for use on a planter as one example, and only an example. While the invention is described for use on planters, it is also applicable, and hereby contemplated to be used in association with any agricultural implement or machine, which travels across a farm field and thereby causes compaction of the soil. These implements and machines may include the following; planters, cultivators, fertilizer applicators, sprayers, liquid manure tanks, row cultivators, harvesters, pull behind tanks, tractors, disks, harrows, aerators, chisels, or rippers.

The invention, in this particular form, consist of a moving linkage that allows the tillage device to raise and lower into and out of the soil, a tilling mechanism that effectively fractures and decompresses the compacted layers of soil, and a method of attachment to machine or implement, and the ability to be disengaged the system from use independent of the implement or machine it is attached to.

BRIEF DESCRIPTION OF THE DRAWINGS

FIG. 11 is a perspective view of a third embodiment of a tillage device for an agricultural implement.

FIG. 12 is a side elevation view of the third embodiment shown in FIG. 11.

DETAILED DESCRIPTION

Figure 1:
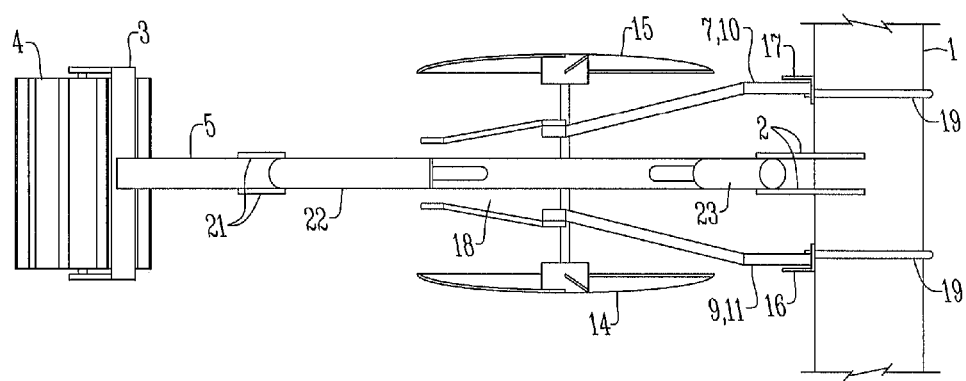
FIG. 1 is a top elevation view of a first embodiment of a tillage device for an agricultural implement having a pair of vertical tines with a rolling basket.
Figure 2:
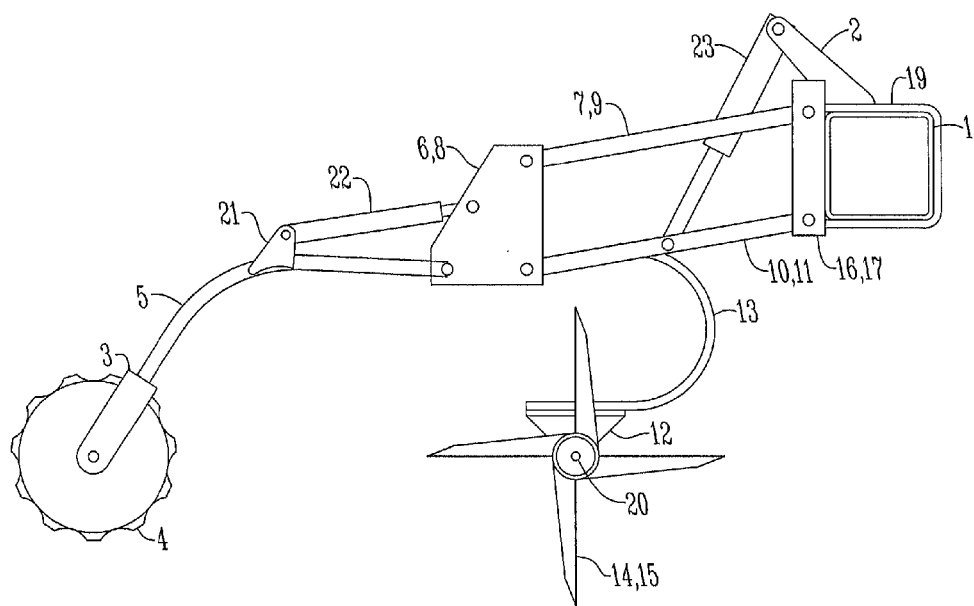
FIG. 2 is a side elevation view of the first embodiment shown in FIG. 1.
Figure 3:
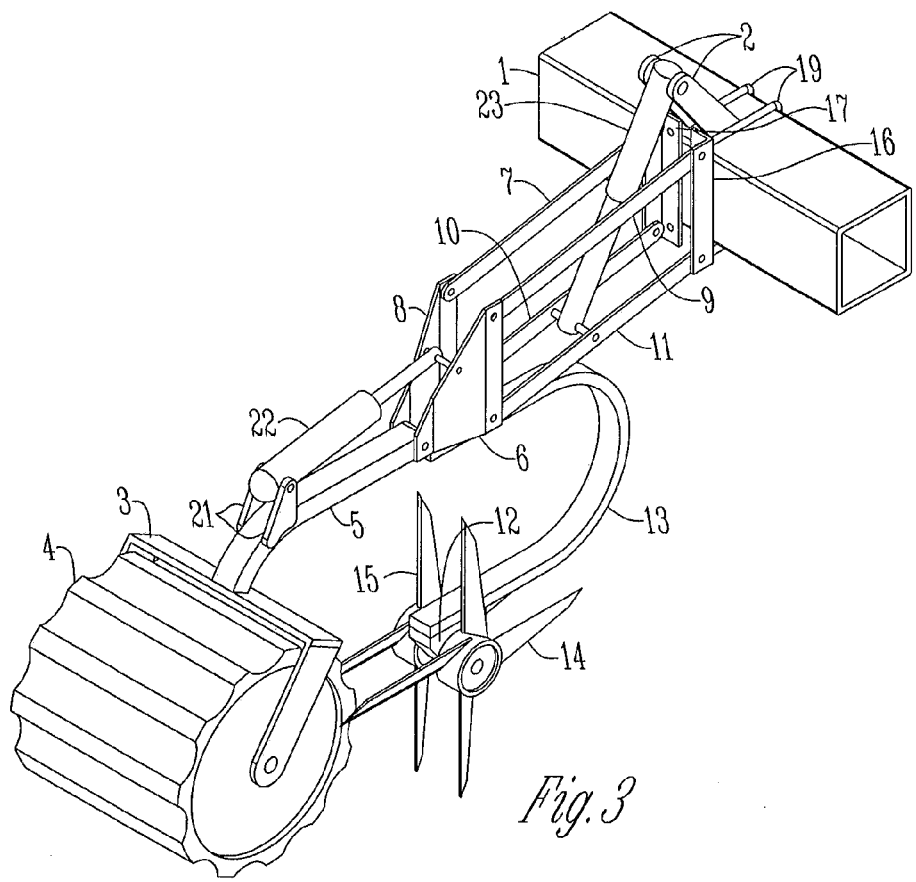
FIG. 3 is a perspective view of the first embodiment shown in FIGS. 1 and 2.
Figure 4:
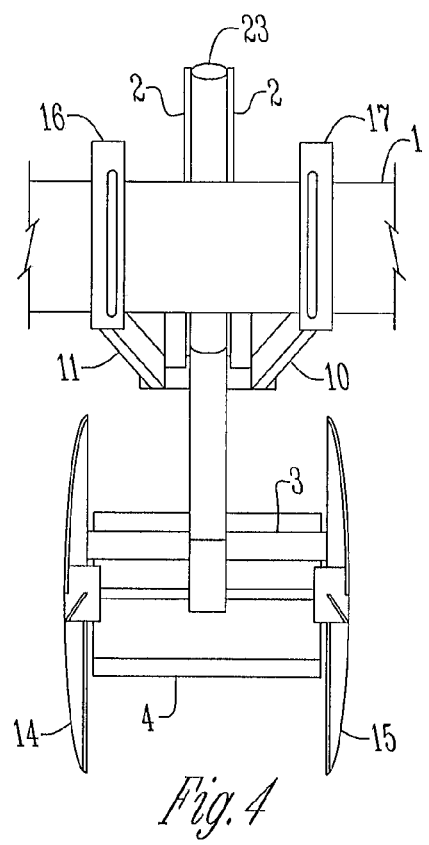
FIG. 4 is a front elevation view of the first embodiment shown in FIGS. 1-3.
Figure 5:
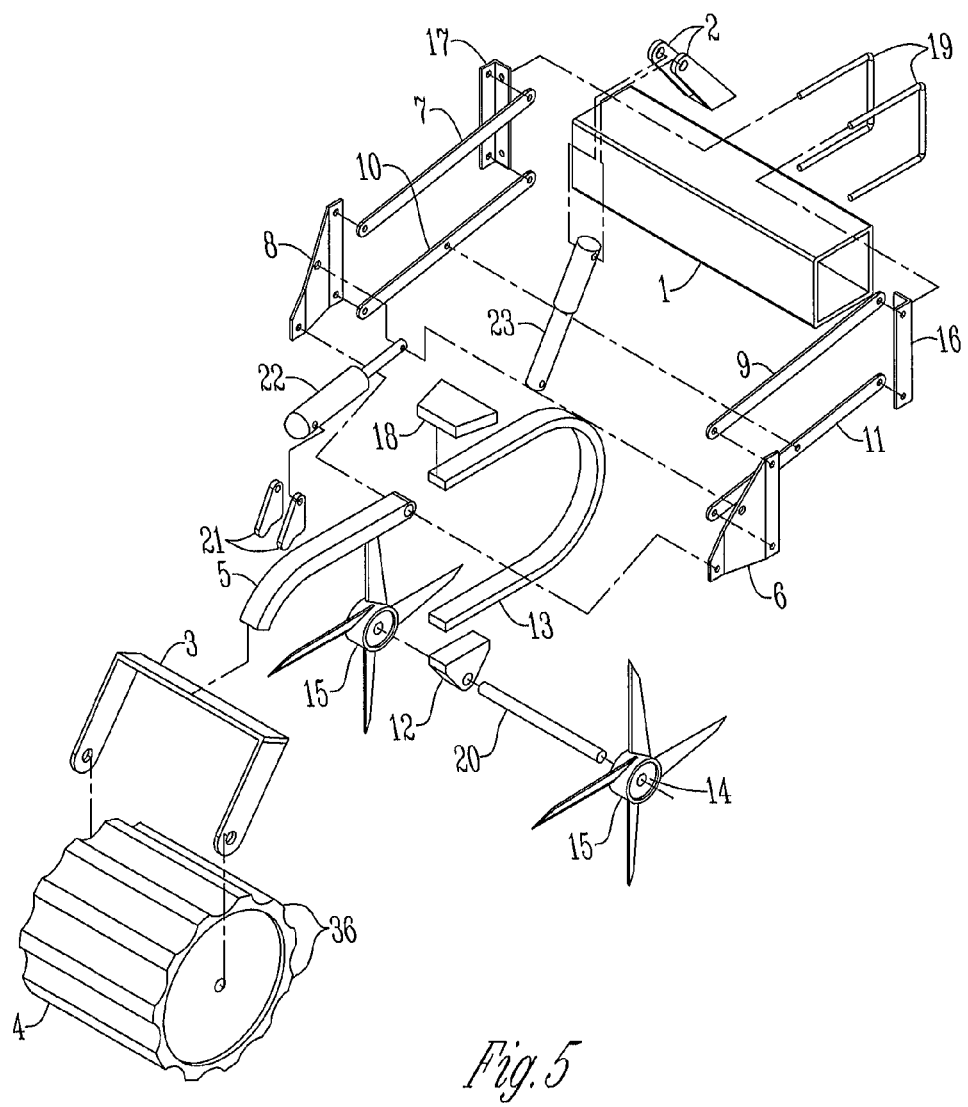
FIG. 5 is an exploded perspective view of the embodiment shown in FIGS. 1-4.
Figure 6:
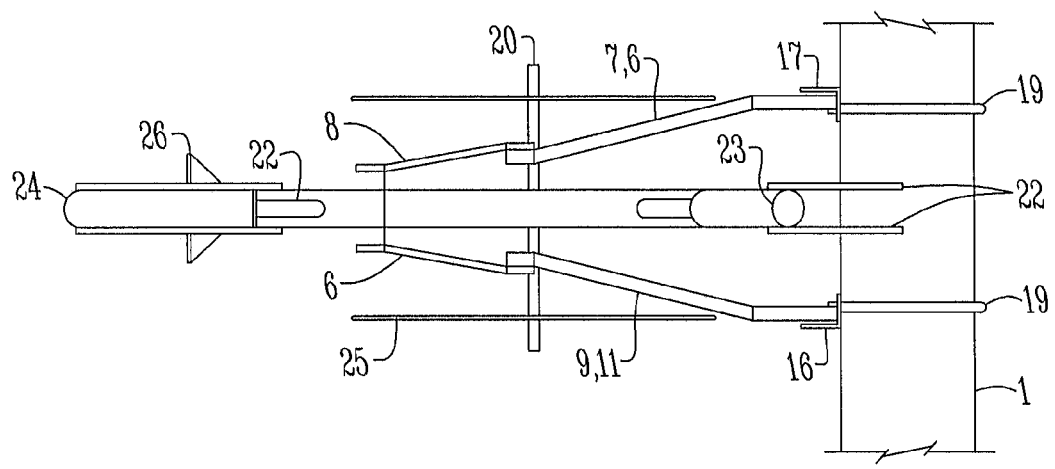
FIG. 6 is a front elevation view of a second embodiment of a tillage device for an agricultural implement having tillage shank and a pair of coulters.
Figure 7:
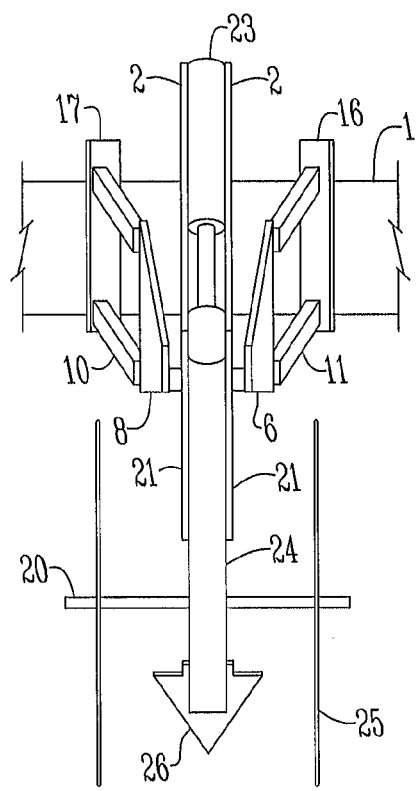
FIG. 7 is a rear elevation view of the second embodiment shown in FIG. 6.
Figure 8:
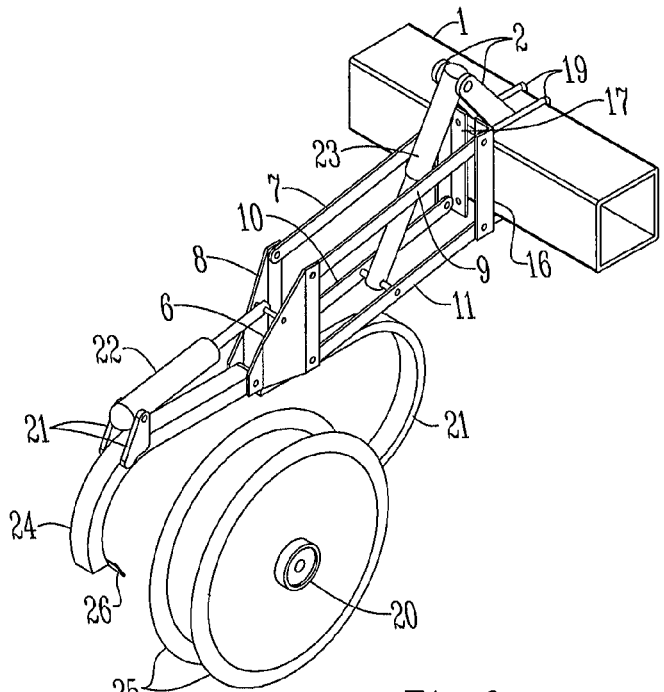
FIG. 8 is a perspective view of the second embodiment shown in FIGS. 6 and 7.
Figure 9:
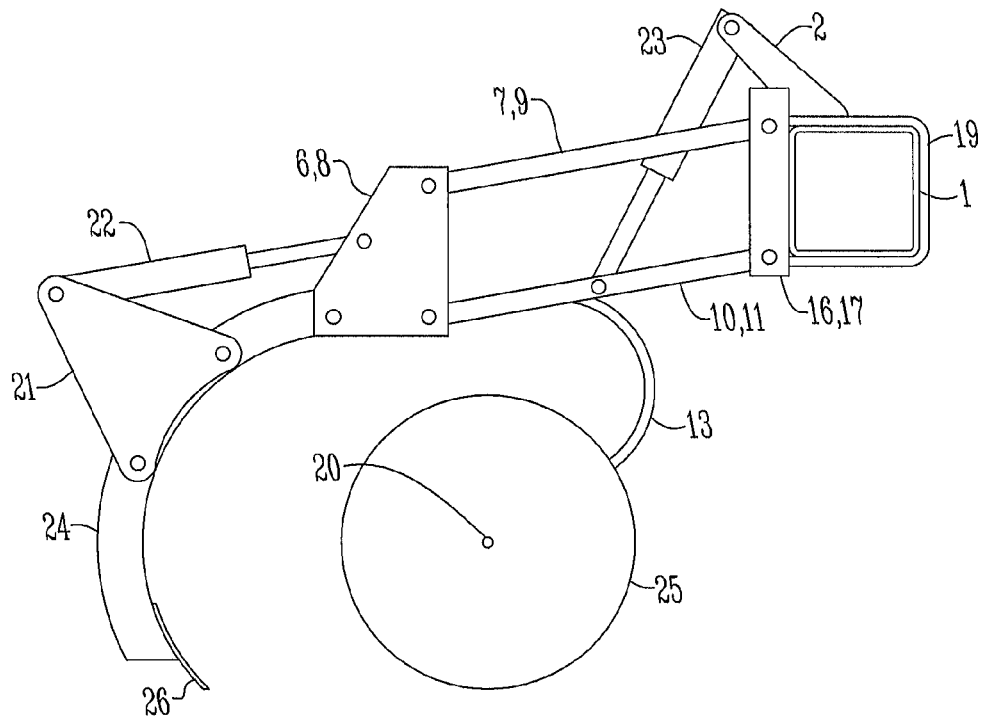
FIG. 9 is a side elevation view of the second embodiment shown in FIGS. 6-8
Figure 10:
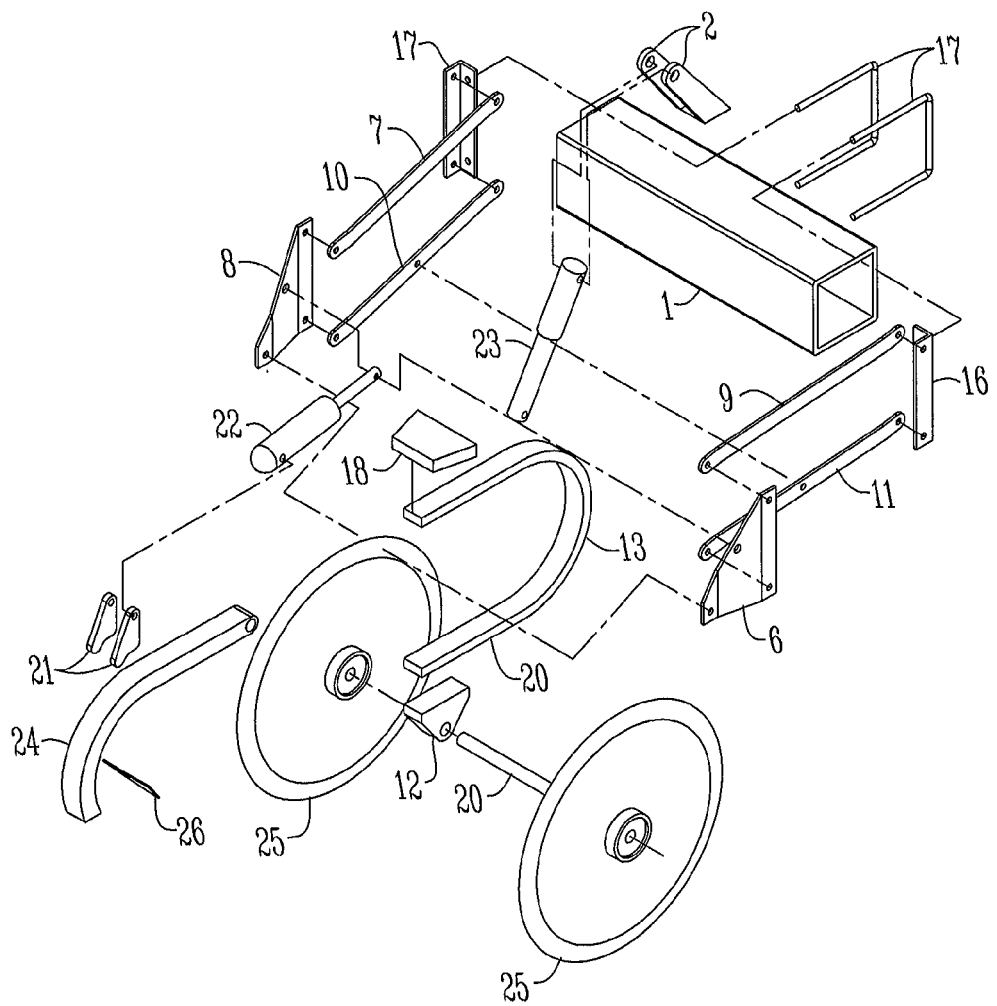
FIG. 10 is an exploded perspective view of the second embodiment shown in FIGS. 6-9.
Figure 13:
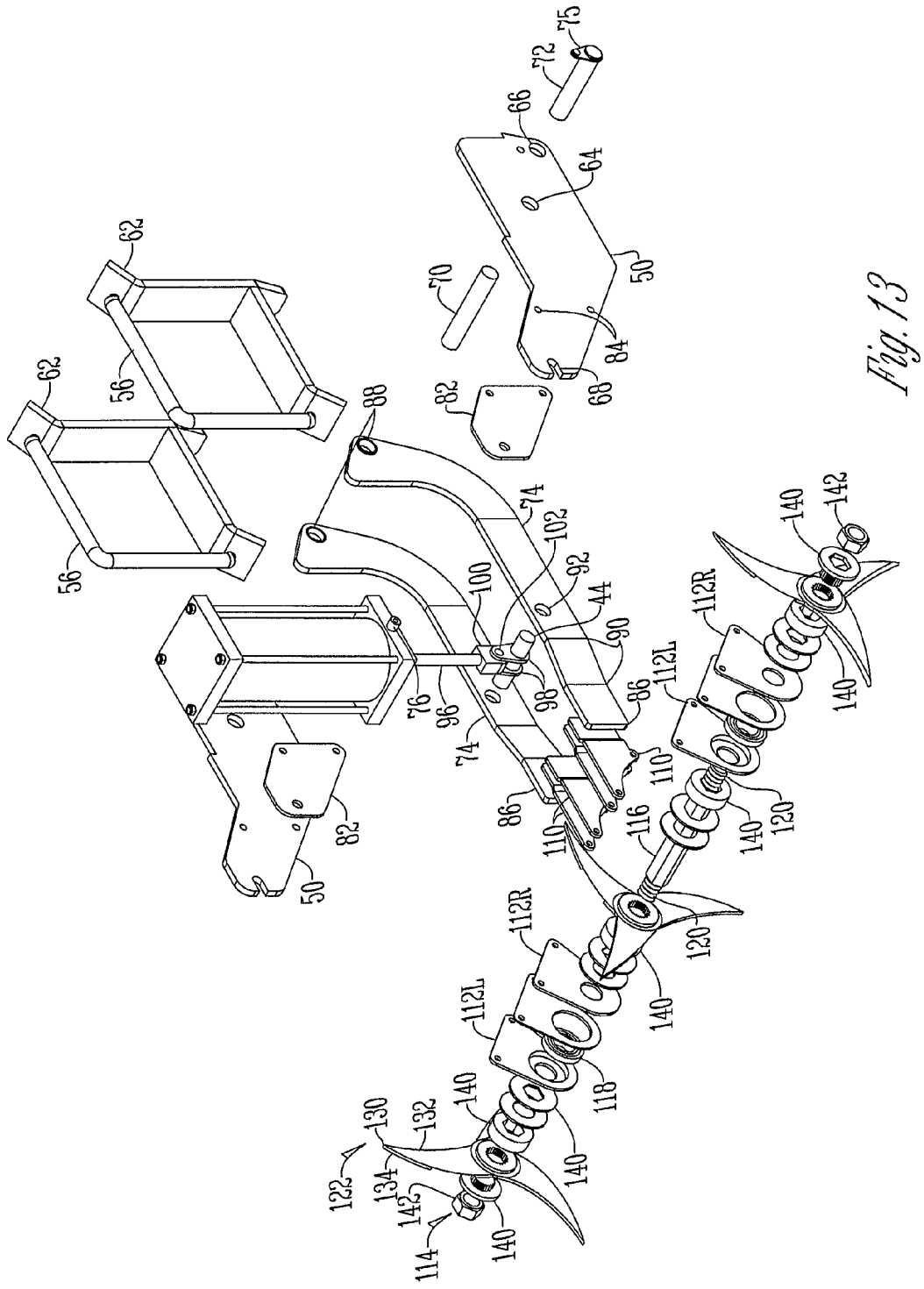
FIG. 13 is an exploded perspective view of the third embodiment shown in FIGS. 11 and 12.
Figure 14:
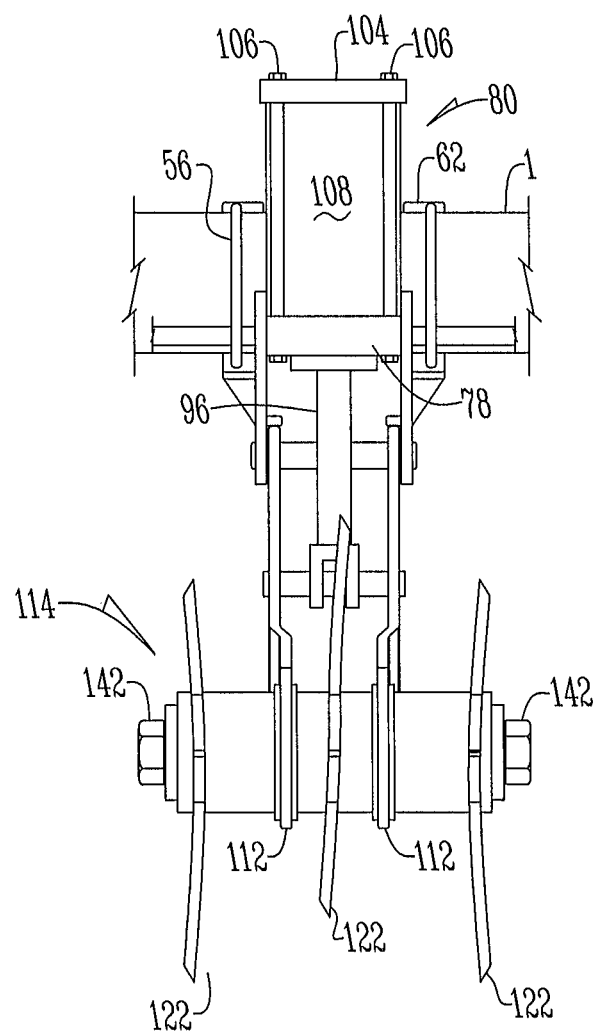
FIG. 14 is a rear elevation view of the third embodiment shown in FIGS. 11-13.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

First Embodiment:

In FIGS. 1-5, show a tillage device 28 bolted to the frame 1 of an agricultural implement 30. The tillage device 28 includes four linkage arms 7, 9, 10, 11 attach to the left and right angle iron 16, 17 with pins to allow vertical movement of the linkage arms 7, 9, 10, 11. The angle iron 16, 17 is mounted to the frame 1 of the agricultural implement 30 with U-bolts 19. A hydraulic cylinder 23 extends between the linkage arms 7, 9, 10, 11 and serves to raise and lower the linkage arms 7, 9, 10, 11 when actuated. The hydraulic cylinder 23 connects at its upper end to a pair of mounting plates, 2 fitted to the frame 1. The hydraulic cylinder 23 connects to the inside of the lower linkage arms 7, 9 adjacent its lower end. The linkage arms 7, 9, 10, 11 extend from the angle iron 16, 17 at their upper ends to the two rear mounting plates 6, 8 at their lower ends.

Between these two rear mounting plates 6, 8, the C-spring mount 18 is secured and attached to the C-spring 13, adjacent its upper end. A bearing holder 12 is fastened to the C-spring 13, and a spike shaft 20 is rotatably fitted within the bearing holder 12 and one or more rolling aeration spikes 14,15 are mounted in parallel spaced relation to the spike shaft 20 either in a rotatable or non-rotatable fashion. Also connected to the rear mounting plates 6, 8 is the basket mounting arm 5 and a spring loaded tension rod 22. The tension rod 22 is attached at its lower rearward end to the mounting arm 5 by a bracket 21. The mounting arm 5 attaches at its lower rearward end to the rolling basket leveler 4 by the wheel-mounting bracket 3.

Second Embodiment:

FIGS. 6-10 depict a second embodiment, of a tillage device 28 which is similarly mounted to the frame 1 of an agricultural implement 30 as is shown in FIGS. 1-5 and includes many of the same components and arrangement of parts as is shown and described with respect to the first embodiment. In this arrangement, the rolling aeration spikes 14, 15 are replaced with coulters 25, which are formed in the shape of disks instead of having a plurality of spikes or tines. This embodiment also includes a shank 24 which points forward toward frame 1 and includes a removable shovel or point 26 attached to the lower end of the shank 24. The upper end of shank 24 is connected to the rear mounting plates 6, 8. FIGS. 6-10 also depict a spring-loaded tension rod 22 which connects to the rear plates 6, 8 and the spring mount 21 on the shank 24.

In this proposed embodiment, bolting the tillage device 28 to the frame 1 of an agricultural implement 30 will secure the tillage device 28 to the agricultural implement 30, such as a planter, and allow the tillage device 28 to reside directly behind the wheels 32 of the agricultural implement 30 where the compaction exists. The hydraulic lift cylinder 23 will raise and lower the tillage device 28 into and out of the soil. In doing so, the linkage arms 7, 9, 10, 11 will rotate upon pins that allow rotation and therefore vertical movement at the connecting points. At the rear of the linkage arms 7, 9, 10, 11, the rear mounting plates 6, 8 shall tie the c-spring 13 and rolling basket 4 through the basket mount 5. The c-spring 13 will serve as the mount for the bearing coupling hub 12 which holds the shaft 20 of the rolling vertical tines 14, 15 or coulters 25. As the agricultural implement 30 is pulled by the tractor 34 through the field, the tines 14, 15 or coulters 25 shall enter the soil in a slicing fashion that will break and lift the compacted soil directly behind the wheels 32 of either the agricultural implement 30 or the tractor 34 thus reducing compaction's effect. The rolling basket leveler 4 consists of horizontal rods or ridges 36 that span between each side. It will serve the purpose of breaking any possible clods in the soil by rolling forward behind the tines 14, 15 to press and level the soil. The rolling basket 4 is attached to the tillage device 28 by basket mount arm 5 that can be forced into the soil with varying downwards pressure by adjusting the tension of the spring loaded tension rod 22.

To make this particular embodiment of the invention one ordinarily skilled the art must take the following steps. The first step is to obtain the necessary materials, since the making of the product consist primarily of assembling the different components. The following components may be necessary depending on the application for the invention, implement type, and the desired results; a primary tillage mechanism (vertical tines 14, 15, shank 24 and point 26, coulters 25 or other), hydraulic cylinder 23, rolling basket 4 (optional), C-spring 13 and a spring-loaded tension rod 22. The next step is to fabricate the parallel linkages 7, 9, 10, 11, which includes forward 2 and rear mounting plates 6, 8 on each, an arm 5 for attaching the rolling basket 4 and the bracket 21 to attach the tension rod 22. Once the previous is completed, holes must be made so bolts and pins can fasten the components together in the following manner. First, assemble the arms of the linkage 7, 9, 10, 11 to the angle iron 16, 17 in front and mounting plates 6, 8 in the rear. Then attach the hydraulic cylinder 23 to the front mounting plates 2 and the linkage arms 7, 9, 10, 11. Next, attach the C-spring 13 to the base of the rear connecting plates 6, 8. Then fix either the coulters 25 or the vertical tillage tines 14, 15 to the spike shaft 20 connected to the bearing holder 12 connected to the C-spring 13. Next, assemble the arm 5 for the rolling basket 4 by attaching the bracket 21 and tension rod 22. Once completed attach the rolling basket 4 to the aforementioned arm 5 and mount on the rear connecting plates 6, 8 attached to the linkage arms 7, 9, 10, 11. Alternatively, a shank 14, 15 or other primary tillage system could be attached to the rear mounting plates 6, 8 of the linkage arms 7, 9, 10, 11 and fitted with a tension rod 22. Once all of the previous steps are taken, the entire assembly can be bolted to the frame 1 of the agricultural implement 30 and the hydraulic cylinder 23 can be connected to active lines.

Although the preceding description contains significant detail it should not be construed as limiting the scope or application of the invention but rather as providing illustrations and descriptions of possible embodiments of the invention. These elements could take drastically different form from the design currently proposed and still accomplish the purpose of this invention, to till soil compacted by the wheels of machinery and implements. All of the proposed methods for tilling the soil are not limiting and could be substituted for any other device or system that tills the soil effectively. Any other mounting design, which connects a tilling device 28 in a position to till the wheel compacted soil from the agricultural implement 30 could be used. The tillage device may be modified to include its own source of power or rotation, such as a motor or engine and therefore may till the soil with power of its own, or alternatively the tillage device may be passive and rotate under power from the pulling force of whatever it is attached to. The leveling system could be left out entirely or drastically changed and the invention could still serve its purpose. The lifting capability may take many different forms or be left out entirely. Once again, the entire design and application may be drastically modified from the currently proposed design and application to fit different types and makes of implements without inhibiting the functionality or purpose of the invention to till soil compacted by an implement's or machine's wheels.

In the proposed design, the parallel linkage provides the ability to raise or lower the device, however this functionality can be accomplished through many other forms. From the linkage a number of different designs to till the soil could be used for example, shanks, coulters or an independently powered tilling device. In place of the currently proposed rolling basket leveling system, other approaches could be taken to accomplish the same results, such as drag chains or harrow spikes. The entire tilling system could be arranged in any fashion so long as it tills the compacted soil. Additionally, instead of a hydraulic lifting system a different system may be used, such as a folding linkage attached to the implement's lifting system or an air bag system. It could also be possible to mount the invention ridged on an implement, this would only allow it to move into and out of the soil with the implement, it is attached to.

To use this embodiment of the invention after the assembly is made it must be mounted to an implement or machine. To achieve the purpose of the invention it will need to be located in a position that allows it to till the soil compacted from the wheels of the implement or machine. The hydraulic cylinder 23 allows the tillage spikes 14, 15, or coulters 25 to be raised out of the soil, and lowered into the soil. Once installed, the device can be engaged while traveling through the field by lowering it with hydraulics into the soil at a depth suitable to the soil conditions and type, normally so it tills soil 8-10 inches deep. In most applications, it will achieve its purpose while the machine or implement is engaged. For example, when using it on row-crop planters it will till the soil during the planting process. Furthermore, the implement it is attached to must be in forward motion to allow the device to have an impact and till the soil. Thus, in most cases the compaction will be alleviated by the tillage device during the same pass where it is created by the implement or machine traveling through the field.

Third Embodiment

An alternative third embodiment is presented with reference to FIGS. 11-15. This third embodiment is often used when it is required to position the tillage device 28 between row units 37 of a planter. In this third embodiment, the tillage device 28 includes a pair of mounting plates 50 that are positioned in generally parallel spaced relation to one another. Mounting plates 50 are generally flat and planar in shape and include a number of openings and features as are described herein. Frame mounting members 52 are connected to the upper forward edge of mounting plates 52 and serve to connect to and hold the tube frame 1 of the agricultural implement 30.

Frame mounting members 52 include a generally L-shaped lower portion 54. The L-shaped lower portion 54 is connected to the mounting plates 50 by any means such as welding, screwing, bolting or forming the two components out of a single piece of material. The L-shaped lower portion 54 defines two sides of the square of the tube frame 1. Removably connected to the L-shaped lower portion 54 are one or more straps 56. In the arrangement shown, straps 56 are tubular shaped rods, similar to U-bolts 19 described herein, except straps 56 cover approximately two sides of the tube frame 1, and only include a single 90 degree bend therein. The ends 58 of straps 56 are in one arrangement threaded and angle slightly toward one another and receive conventional nuts 60. These threaded ends 58 extend approximately perpendicularly through angled tabs 62 of the L-shaped lower portion 54 so as to ease installation.

To install the tillage device 28 on tube frame 1 of agricultural implement 30, the L-shaped lower portion 54 is positioned on the lower and forward sides of the tube frame 1 and the straps 56 are positioned on the upper and rearward sides of the tube frame 1, the ends 58 are inserted through he angled tabs 62 and the nuts 60 are tightened over the threaded ends 58 thereby securely but removably installing the tillage device 28 on the agricultural implement.

Mounting plates 50 extend rearward from frame mounting members 52 and include a first opening 64, a second opening 66 and a third opening 68. The first opening 64 receives first shaft 70 which extends between opposing mounting plates 50 thereby connecting them together providing appropriate spacing and rigidity. In one arrangement, first shaft 70 is rigidly mounted to mounting plates 50 and therefore does not allow relative movement therebetween, whereas in an alternative arrangement, the first shaft 70 is non-rigidly mounted and therefore allows rotation and relative movement.

Second opening 66 receives second shaft 72 which extends between opposing mounting plates 50 thereby connecting them together providing appropriate spacing and rigidity. In one arrangement, second shaft 72 is rigidly mounted to mounting plates 50 and therefore does not allow relative movement therebetween, whereas in an alternative arrangement, the first shaft 72 is non-rigidly mounted and therefore allows rotation and relative movement. Second shaft 72 also extends through the upper forward end of swing arms 74. In one arrangement, swing arms 74 rotate or pivot upon second shaft 72. Also, in one arrangement, first shaft 70 between opposing mounting plates 50 provides a stop for the rotation of swing arms 74. That is, when swing arms 74 rotate fully downward, the upper rearward end of swing arms 74 engage the first shaft 70 thereby providing a rotational stop. In one arrangement, as is shown, a collar 75 is connected to the ends of second shaft 72 and serves to mount and hold second shaft 72 in place within second opening 64.

Third opening 68 receives second shaft 76 which extends between opposing mounting plates 50 thereby connecting them together providing appropriate spacing and rigidity. In one arrangement, as is shown, third shaft 76 is connected to the base plate 78 of hydraulic cylinder 80. While cylinder 80 is herein described as a hydraulic cylinder, it is hereby contemplated that any form of a device which converts pressure or power to movement is hereby contemplated for use such as a hydraulic cylinder, a pneumatic cylinder, an air bag, a solenoid or any other device. Also positioned adjacent the inward side of third opening 68 is a cylinder mounting plate 82 which is connected to mounting plate by any means such as bolting, welding or the like. In the arrangement shown, cylinder mounting plate 82 is connected to mounting plate 50 by conventional fasteners 84, such as bolts or screws. In the arrangement shown, cylinder mounting plate includes third opening, whereas the mounting plate 50 includes a notch in that forms third opening 68. This combination of a notch in the mounting plate 50 and an opening in the cylinder mounting plate 82 allows the third shaft 76 to be connected to and held by the cylinder mounting plate 82 while allowing for support to be provided by the mounting plate 50 while simultaneously allowing for cylinder 80 to pivot during operation. In the arrangement shown, the portion of mounting plates 50 that include third opening 68 are positioned above and rearward from the other portions of mounting plate 50, so as to place cylinder 80 the appropriate position for controlling swing arms 74.

Swing arms 74 are generally elongated, planar, and L-shaped. Swing arms 74 are positioned in approximate parallel spaced alignment to one another and extend from an upper forward end to a lower rearward end 86. Forward end includes an opening 88 which receives second shaft 72. Opening 88, in one arrangement is matched within close tolerances to the diameter of second shaft 72 so as to provide a close fit while allowing for smooth rotation thereon. In one arrangement, a collar or tube extends through or between opposing opening 88 so as to increase the surface area of contact between swing arms 74 and second shaft 72 adjacent second opening 66.

While swing arms 74 are generally positioned in generally parallel spaced relation to one another, swing arms 74 neck inward or narrow toward one at fold lines 90 at or near rearward end 86. In the arrangement shown, this neck inward is accomplished by a simple bend in the swing arms 74 before the rearward ends 86 resume their parallel alignment and extension adjacent rearward ends 86. An opening 92 is positioned between rearward end 86 and the forward end of swing arms 74.

Opening 92 receives a fourth shaft 94. Fourth shaft 94 serves to connect the lower rearward ends of opposing swing arms 74 and thereby provides appropriate spacing and rigidity thereto. In addition, fourth shaft 94 serves as a mounting point and pivot point for push rod 96 of cylinder 80. To facilitate this connection, fourth shaft 94 includes a pair of struts 98 which extend outwardly from forth shaft 94 in approximate parallel spaced relation and include an opening adjacent their ends. In this arrangement, push rod 96 includes a head 100 with a head shaft 102 that extends outwardly therefrom and engages and connects to the openings in struts 98. In this arrangement, as the pushrod pushes or pulls, the torque causes the fourth shaft 94 to rotate and thereby causes the head shaft to rotate within the openings of struts 98 thereby allowing for appropriate angular adjustment. In an alternative arrangement, cylinder 80 and/or push rod 96 is connected to swing arms 74 or fourth shaft 94 by any other manner or method.

Cylinder 80 includes a base plate 78 positioned in approximate parallel space alignment to an opposing top plate 104 which are connected together by a plurality of support fasteners 106. Positioned within the support fasteners 106 and between the base plate 78 and top plate 104 is a cylinder mechanism 108. Push rod 96 extends outwardly through base plate 78 which is connected to third opening 68 of mounting plates 50 and cylinder mounting plates 82. As the push rod 96 extends and retracts the head shafts 102 rotate within the openings of struts 98 and fourth shaft 94 rotates while cylinder 80 tilts or rotates upon third shaft 76 which is held between opposing mounting plates 50 in third opening 68.

Yokes 110 are connected adjacent the rearward ends 86 of swing arms 74 and extend rearward therefrom. In the arrangement shown, one yoke 110 is positioned on either side of the rearward end 86 of swing arms 74 and extend in generally planar parallel spaced relation therefrom. Yokes 110 are connected to swing arms 74 by any manner or means such as welding, screwing, bolting or forming the components out of a single piece of material. The rearward end of yokes 110 include an arcuate or curved surface and an opening adjacent the upper end and lower end. These spaced openings are used to mount one or more arbor brackets 112 to yokes 110 using conventional fasteners such as screws or bolts, and the curved rearward end of yokes 110 provides clearance for the rotation of roller assembly 114. In the arrangement shown, the upper forward end of arbor bracket 112 is connected to yokes 110 and in this way yokes 110 provide rigidity and stability to arbor bracket 112. In this arrangement, arbor bracket is held in approximate alignment with the rearward end 86 of swing arm 74.

Arbor brackets 112 have a generally centrally positioned circular opening therein that receives arbor shaft 116 there through. A bearing 118 is connected to and/or positioned between arbor shaft 116 and arbor bracket 112. Bearing 118 is any form of a bearing such as a roller bearing, a race bearing, or the like and allows arbor shaft 116 to rotate within arbor bracket 112. In one arrangement bearing 118 is connected to a single arbor bracket 112, in an alternative arrangement bearing 118 is sandwiched between a pair of arbor bracket 112 thereby holding the bearing in place therebetween. Alternatively, bearing 118 is connected to arbor bracket 112 by any other manners or methods that allows secure attachment while allowing rotation of arbor shaft 116. In one arrangement, as is shown, bearings 118 are held within a pocket formed in arbor bracket 112. In this arrangement a left arbor bracket 112L, a center arbor bracket 112C and a right arbor bracket 112R are used. The left arbor bracket 112L has a pocket that receives the left side of bearing 118. The center arbor bracket 112C has an opening that fits around and that receives the center portion of bearing 118. The right arbor bracket 112R has a pocket that receives the right side of bearing 118. These three components 112L, 112C and 112R are positioned around and clamshell bearing 118 therebetween. These connected components 112L, 112C, and 112R with bearing 118 therein are then positioned between opposing yokes 110 thereby forming a rigid structural component that allows for rotation of roller assembly 114 therein. The spacing of a pair of these arbor brackets 112L, 112C and 112R, each connected between a pair of yokes 110 connected to swing arms, provides balance and stability to roller assembly 114.

In the arrangement shown, arbor shaft 116 extends a length between opposing threaded ends 120 and has a non-round portion positioned therebetween. In the arrangement shown, the non-round portion of arbor shaft 116 has a hexagonal shape that allows for mounting of other components thereon while preventing the rotation of these components on arbor shaft 116. While a hexagonal shape is shown, any other non-round shape is hereby contemplated for use.

One or more blade assemblies 122 are connected to and positioned around arbor shaft 116. In the arrangement shown, three blade assemblies 122 are connected to arbor shaft 116; one blade assembly 122 positioned adjacent each threaded end 120 of arbor shaft 116, and one blade assembly 122 positioned approximately centrally on arbor shaft 116 between the opposing swing arms 74 and between opposing pairs of yokes 110. However, any other number of blade assemblies 122 are hereby contemplated for use such as one, two, four, five, six, seven, eight, nine, ten or more.

In the arrangement shown, blade assemblies 122 include a central hub 124 which has a generally centrally positioned opening 126 that is sized and shaped to fit around arbor shaft 116. In the arrangement shown, the centrally positioned opening 126 has a ridged or knurled surface such that when it is positioned around the hexagonal arbor shaft 116 it does not rotate. It is hereby contemplated that the centrally positioned opening 126 has a matching shape, that is when arbor shaft 116 is hexagonal, centrally positioned opening 126 is similarly hexagonal in shape and fits over arbor shaft 116 within close tolerances or fitting frictional engagement.

A plurality of tines 128 are connected to central hub 124. Tines 128 are formed of any suitable size, shape and design. In the arrangement shown, three tines 128 are connected to central hub 124 and are equally spaced there around. That is, each tine is spaced approximately 102 degrees from the next tine 128 around the central axis of rotation of arbor shaft 116. Any other number of tines 128 are hereby contemplated for use such as one, two, four, five, six, seven, eight, nine, ten or more. Or alternatively, disks or coulters 25 of any design are hereby contemplated for use instead of tines 128. In one arrangement, as is shown, tines 128 are removable and replaceable. That is, tines 128, which can break or wear over time, can be removed and replaced on central hub 124, which is not likely to wear or break. This reduces the cost of ownership and allows for easy customization and/or replacement. Removable tines 128 are connected to central hub 124 by any manner or method such as conventional fasteners such as bolts or screws, or through fitting engagement such as interlocking features, like a dovetail joint or the like. In an alternative arrangement, blade assemblies 122 are formed of a single piece and must be wholly replaced.

Tines 128 extend from their base, which connects to central hub 124, to a point 130. In one arrangement, to improve the strength and rigidity and durability of tines 128, gussets 131 are formed in or connected to the sides of tines 128. Gussets 131 are formed of any suitable size, shape and design, and in the arrangement shown, gussets 131 are formed of an added piece of material that extends outwardly from the side of tines 128 adjacent the base of tines 128 and terminates before point 130. Tines 128 include a leading edge 132, which first engages the soil as the roller assembly 114 rotates, and a trailing edge 134, which last exits the soil as the roller assembly 114 rotates. Tines 128 can be formed of any suitable size, shape or design. In one arrangement, leading edge 132 and trailing edge 134 are straight so as to form a triangle at point 130. In an alternative arrangement, leading edge 132 and trailing edge 134 are arcuate or curved. In the arrangement shown in FIGS. 13 and 15, leading edge 132 is slightly concave in shape, whereas the trailing edge 134 is slightly convex in shape, which is the standard arrangement and has yielded positive results in testing. With that said, it is hereby contemplated to reverse this arrangement, as is shown in FIGS. 11 and 12, which may have benefits over the standard arrangement in certain applications. It is hereby contemplated to place a beveled portion in one or both of the leading edge 132 and/or trailing edge 134. In the arrangement shown, the leading edge 132 has a beveled edge 136 that extends the entire length, or a majority of the length of the leading edge 132 from central hub 124 to point 130. However, it is hereby contemplated to place the beveled edge 136 on any other amount or portion of the leading edge 132. In the arrangement shown, the trailing edge 134 has a beveled edge 138 that extends a portion of the length of the trailing edge 134 and is positioned near or adjacent the base and terminates prior to point 130. In the arrangement shown, beveled edge 136 on leading edge 132 and beveled edge 138 on trailing edge 134 are positioned on opposite sides or faces of tine 128. Alternatively, beveled edges 136 and 138 are positioned on the same face or side of tines 128. Any angle of beveling is hereby contemplated for use, however an angle of between 0 and 60 degrees has been used with success and more specifically between 10 and 50 degrees. The beveling on the leading edge 132 serves to cut into the soil which reduces the friction or resistance, whereas the beveling on the trailing edge 134 serves to reduce the friction as the tine leaves the soil.

Figure 15:
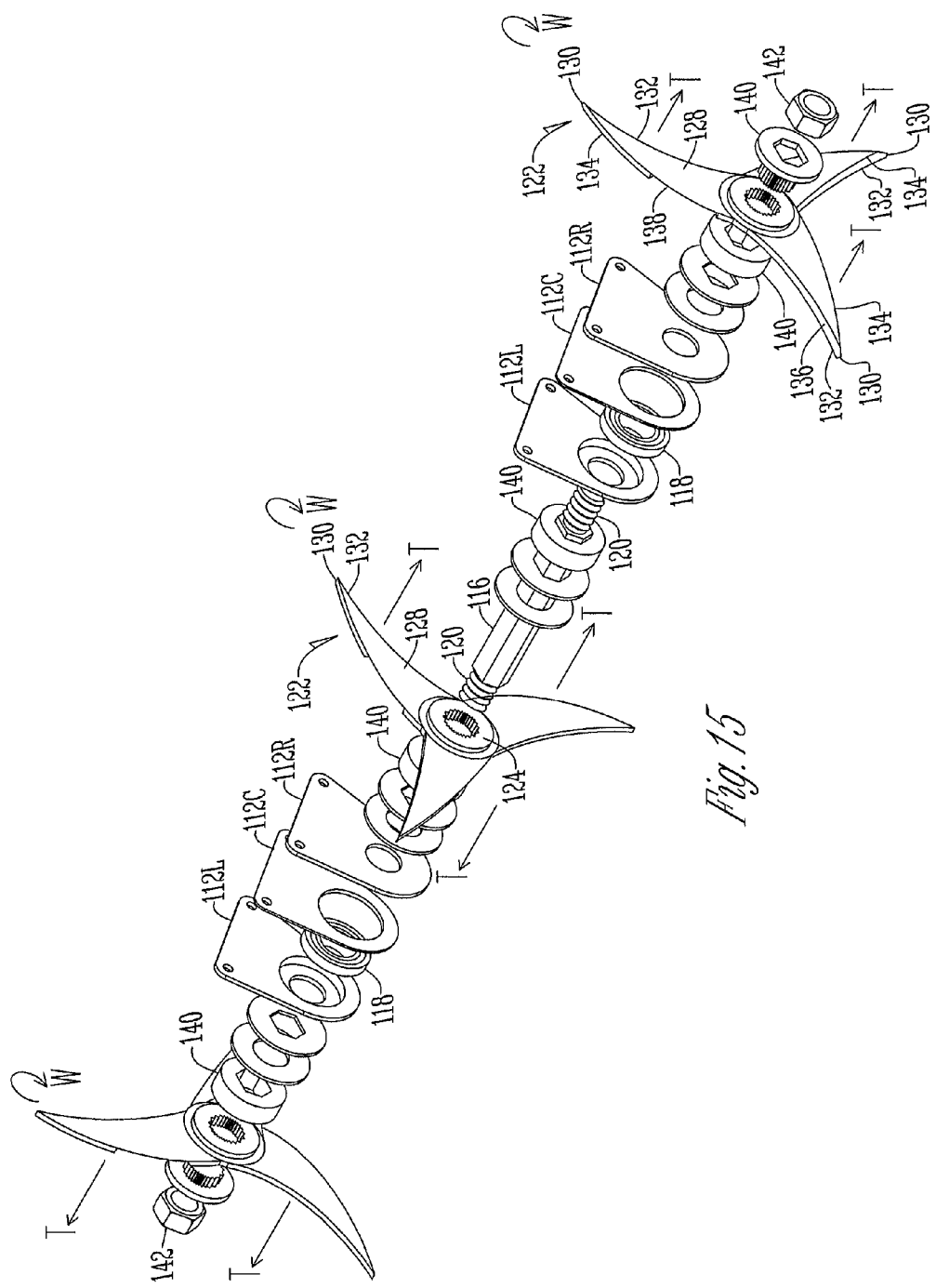
FIG. 15 is an exploded perspective view of the roller assembly of the third and fourth embodiments.
Figure 16:
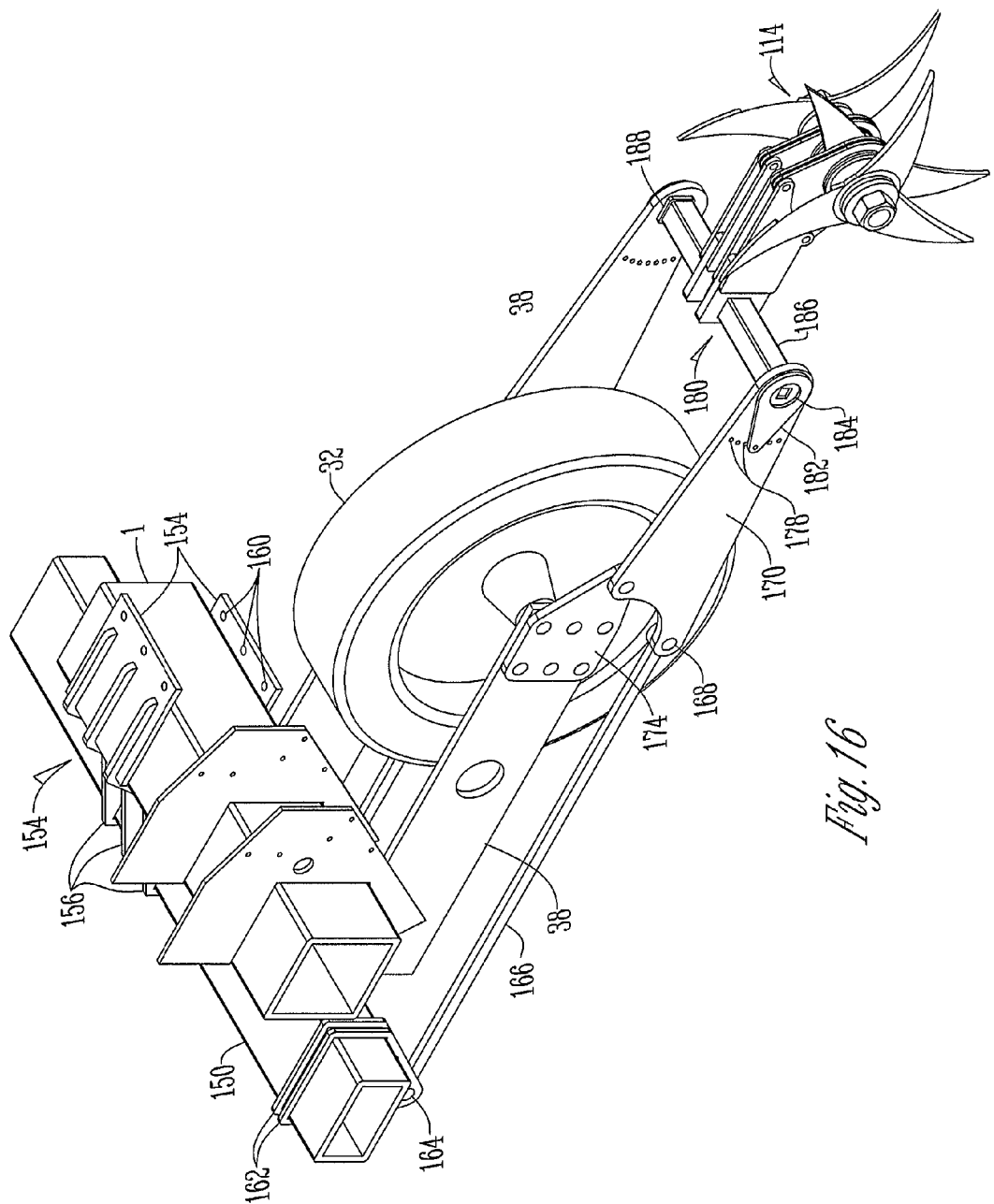
FIG. 16 a perspective view of the fourth embodiment of a tillage device for an agricultural implement.

In one arrangement, tines 128 are straight, flat and planar and therefore extend outwardly from arbor shaft 116 in a straight, flat and planar fashion. That is, in these arrangement tines 128 are aligned and extend perpendicular to the axis or rotation of arbor shaft 116. In an alternative arrangement, as is shown, tines 128 are not straight, flat and planar and instead tines 128 are tilted and/or twisted. Tilted herein means to be bent or tilted out of perpendicular alignment with the axis of rotation. As is shown in FIG. 15, the tines 128 are tilted out of perpendicular alignment with the axis of rotation in the direction of arrows T. In this arrangement, the outside blade assemblies 122 are tilted outward, whereas the centrally positioned blade assembly 122 shares a combination of left and right tilted tines 128. It is hereby contemplated that any combination of tilted tines can be used. In addition, any amount of tilting is also hereby contemplated for use, however tilting of between 0 and 20 degrees has been used with success. Tilting the outwardly positioned tines 128 outwardly allows for greater surface area to be covered by the blade assemblies. The tines 128 can tilt at a single point, meaning once tilted they extend in straight fashion from the point of tilting. Alternatively, tines can tilt along their length at multiple points of tilting or they can arcuately curve to accomplish the tilting.

It is also hereby contemplated to twist tines 128. Twist herein means to be bent or curve out of being straight, flat and planar as the tines 128 extend from their base to their tip 130. As is shown in FIG. 15, the tines 128 are twisted either in clockwise or counterclockwise fashion along arrows W. Any combination of clockwise and counterclockwise twisted tines are hereby contemplated for use. That is, in one arrangement all tines 128 on a blade assembly 122 can be twisted the same direction (CW or CCW), or alternatively a combination of twisting can be used, some one direction whereas others are twisted in the opposite direction, whereas others may not be twisted at all. In addition, any amount of twisting is also hereby contemplated for use, however twisting of between 0 and 20 degrees has been used with success. Twisting can be combined with tilting. That is, some tines 128 can be tilted one direction and twisted another direction, whereas other tines 128 are tilted one direction yet twisted in the opposite direction. In addition the amount of tilting and twisting can be varied, as can the length, size, shape and design of the tines 128 as well as the angle and placement of beveling. Therefore, an endless combination of tines 128 can be developed to form blade assemblies 120, each suitable for different field conditions.

The roller assembly 114 is formed by positioning the central blade assembly 122 between the pairs of yokes 110. Spacers 140 are positioned adjacent either side of the central blade assembly 122 to maintain proper spacing with respect to yokes 110 and swing arms 74. Spacers 140 are formed on any suitable size, shape and design, and can be formed of one or more conventional washers, rubber, plastic or metallic bushings, or any other device. Next, arbor shaft 116 is inserted through the openings in spacers 140 and central hub 124 of the central blade assembly which holds the arbor shaft 116, spacers 140 and central blade assembly 122 in alignment with one another. Next, the arbor brackets 112L, 112C and 112R are formed with bearings 118 positioned therein. These arbor brackets 112 are positioned over arbor shaft 116 adjacent the outward sides of spacers 140 and central blade assembly 122 and the arbor brackets 112 are affixed to the rearward ends of yokes 110. Next, an additional spacer 140 is placed outward of the arbor brackets 112 and outward blade assemblies 122 are installed over the arbor shaft 116. Next, an outward spacer 140 is positioned over the arbor shaft 116 outward of the outward blade assemblies 122 and a nut 142 is tightened over the outward threaded ends 120 of arbor shaft 116 thereby tightening and holding all components of the roller assembly 114 together. Additional washers or spacers 140 can be used to accomplish proper spacing and alignment.

As is seen best in FIG. 12, the blade assemblies 122 are equally staggered with respect to one another to provide smooth and even tilling of the soil. That is, if each blade assembly 122 includes three tines 128 which are evenly spaced to one another (e.g. points 130 are 120 degrees from one another) and three blade assemblies 122 are positioned over arbor shaft 116, then a point 130 of a blade assembly is positioned approximately every 40 degrees thereby providing even, smooth and effective tillage.

In operation, the third embodiment, depicted in FIGS. 11-15 is connected to the frame 1 of agricultural implement 30 behind and in alignment with one or more wheels of the tractor 24 or agricultural implement 30. Installation is affected by placing the L-shaped lower portion 54 of frame mounting members 52 on the lower and forward side of frame 1, and placing strap 56 on the rearward and upper sides of frame 1 and tightening the two components together through nuts 60 over ends 58. Next, a source of power is connected to cylinder 80, such as a source of pressurized oil, air or the like, or a conventional electrical connection. Once activated, the cylinder 80 forces the swing arms 74 upward and downward between an engaged position, wherein the tines 128 of the roller assembly 114 engage the soil and a disengaged position wherein the tines 128 do not engage the soil. As the cylinder 80 operates, the swing arms 74 pivot on second shaft 72 and the head 100 pivots along with struts 98 and fourth shaft 94. The user can operate the cylinder 80 to apply the desired position and down force to accomplish optimal tillage.

As the tractor 34 passes through the field, the roller assembly 114 rolls and the tines 128 intermittently engage the soil. When obstacles are engaged by the roller assembly the swing arms pivot on second shaft 72 to compensate for these variables. As the roller assembly 114 rolls, the beveled leading edge 132 slices into the soil thereby reducing entry friction. As the tines 128 pass through the soil, the twist and the tilt of the tines 128 disturbs the soil thereby breaking up pockets of compaction. As the tine 128 exits the soil the beveled trailing edge 134 reduces exit friction.

Fourth Embodiment

An alternative fourth embodiment is presented with reference to FIGS. 16-20. This fourth embodiment is often used when it is required to position the tillage device 28 behind a tilting wheel 32 which is held by a wheel brace 38 which is connected to the tube frame 1 of a planter. The wheel brace 38 is tilted so as to raise and lower a planter into and of out planting position.

In this fourth embodiment, the tillage device 28 includes tool bar 150. Tool bar 150 is formed of any suitable size and shape. In one arrangement, tool bar 150 is a generally square or rectangular pipe or tube that extends a length between opposing ends 152. In one arrangement, tool bar 150 extends the length to cover one tilting wheel 32 and one set of wheel braces 38. In an alternative arrangement, tool bar 150 extends the length to cover two tilting wheels 32 and two sets of wheel braces 38. In yet another alternative arrangement, tool bar 150 extends the length to cover three or more tilting wheels 32 and a corresponding number of sets of wheel braces 38. Going forward, tool bar 150 will be described as covering two tilting wheels 32 and two sets of wheel braces 38, as this is a common arrangement, however the invention is not so limited.

One or more tube frame brackets 154 are connected to the tool bar 150. In one arrangement, a single tube frame bracket 154 is used and is positioned approximately centrally on the tool bar 150 and is positioned between a pair of wheels 32 and wheel braces 38. Tube frame bracket 154 is formed of any suitable size, shape and design and serves to removably and replaceably connect tool bar 150 to tube frame 1 of the agricultural implement 30. In one arrangement, as is shown, tube frame brackets 154 include a three tool bar mounting plates 156 positioned in parallel spaced relation to one another. Tool bar mounting plates 156 have an opening in their lower forward end that receives tool bar 150 within close tolerances. Tool bar mounting plates 156 extend upward and rearward therefrom and have a U-shaped or C-shaped opening that faces rearward that is sized and shaped to receive tube frame 1 of agricultural implement within close and tight tolerances. Surface plates 158 are mounted to the mounting plates 156 within the C-shaped or U-shaped opening. These surface plates 158 help to provide strength and rigidity to the plurality of mounting plates 156, and also provide increased surface area for engagement between the tool bar 150 and the tube frame 1, which provides a stronger and more accurate connection therebetween. Tool bar mounting plates 156 are connected to tool bar 150 by any means known in the art such as welding or forming the components out of a single piece of material. Similarly, surface plates 158 are connected to tool bar mounting plates 156 by any means known in the art such as welding or forming the components out of a single piece of material. A plurality of openings 160 are positioned in spaced alignment along the rearward edge of the upper and lower surface plates 158 which receive straps or fasteners, such as bolts, which extend between the upper and lower surface plates 158 and tightened together thereby securing the tube frame 1 within tube frame bracket 154.

A plurality of linkage arm brackets 162 are positioned along tool bar 150. In one arrangement, as is shown, a pair of linkage arm brackets 162 are positioned in parallel spaced alignment on either side of wheel 32 and wheel brace 38. The linkage arm brackets 162 have an opening adjacent their upper end which is sized and shaped to receive tool bar 150 within close tolerances. Linkage arm brackets 162 are connected to tool bar 150 by any manner or method such as welding, or forming the components out of a single piece of material. Linkage arm brackets 162 have a tab which extends downwardly from the tool bar 150. This tab includes an opening adjacent its bottom end which receives a first linkage arm shaft 164. First linkage arm shaft 164 extends between a pair of opposing linkage arm brackets 162. The upper end of a linkage arm 166 is positioned between these pairs of linkage arm brackets 162 such that the first linkage arm shaft 164 extends through the upper end of the linkage arm 166. Linkage arm 166 tilts or pivots on the first linkage arm shaft 164 to adjust to angular positioning between a raised and a lowered planter position. Linkage arm 166 is formed of any suitable size, shape and design. In one arrangement, as is shown, linkage arm 166 is an elongated bar, or rod.

Linkage arm 166 connects at its lower end to a second linkage arm shaft 168. Second linkage arm shaft 168 connects the lower end of linkage arm 166 to swing arm 170 and like first linkage arm shaft 164, allows for tilting or rotation of the linkage arm 166.

Swing arm 170 is formed of any suitable size, shape or design. In one arrangement, as is shown, swing arm 170 is generally flat, straight and planar in shape and extends from a forward end, having a concave curved shape, and a rearward end having a concave rounded shape. The forward end of swing arm 170 includes a lower opening, which receives second linkage arm shaft 168, and an upper opening which receives fastener 172. Fastener 172 is any form of a device that connects two devices together while allowing angular rotation between the two components, such as a bolt, shaft or screw. Fastener 172 connects the upper forward end of swing arm to wheel brace mounting plate 174. Wheel brace mounting plate 174 is formed of any suitable size, shape and design and serves to connect swing arm 170 to wheel brace 38. In the arrangement shown, wheel brace mounting plate 174 is generally flat, straight and planar and includes a plurality of openings which receive conventional fasteners, such as bolts or screws that connect wheel brace mounting plate 174 to wheel brace 38.

The rearward end of swing arm 170 includes a torsion shaft opening 176 and a plurality of adjustment openings 178. Torsion shaft opening 176 is sized and shaped to allow torsion shaft 180 to extend there through. Positioned a distance forward of the torsions shaft opening 176 are a plurality of adjustment openings 178 that are aligned in curved vertical spaced alignment from the upper side of swing arm 170 to the lower side of swing arm 170. A torsion shaft adjustment plate 182 is connected to the rearward end of swing arm 170.

Torsion shaft adjustment plate 182 is formed of any suitable size, shape and design. In the arrangement shown, torsion shaft adjustment plate 182 is generally flat, straight and planar in shape with a pointed forward end and a rounded rearward end having a recessed collar 184 that is generally circular in shape and protrudes inward adjacent the rearward end. Collar 184 is sized and shaped to be received within close tolerance of torsion shaft opening 176 and allow for rotation therein. When collar 184 is positioned within torsion shaft opening 176, an opening in the forward end of torsion shaft adjustment plate 182 aligns with the adjustment openings 178 in swing arm 170. This arrangement allows for angular adjustment of the torsion shaft 180 by selecting various adjustment openings 178 and tightening the torsion shaft adjustment plate 182 to the swing arm 170 through a conventional fastener.

Torsion shaft 180 is formed of any suitable size, shape and design. In the arrangement shown, torsion shaft 180 has an elongated square shaft 186 that terminates in end plates 188 with square heads 190 that extend outwardly therefrom. In one arrangement, torsion shaft 180 is a solid piece of material that is generally rigid. In an alternative arrangement, opposing square heads 190 are connected to one another and/or to the shaft 186 by means of a flexing member (not shown) such as a spring or the like. This flexing member allows heads 190 to slightly rotate with respect to the shaft 186, providing some flexibility or give to the system when variations in the field are encountered.

Heads 190 are received in an opening in torsion shaft adjustment plate 182, more specifically within the collar 184 of the torsion shaft mounting plate 182. In one arrangement, these openings are sized and shaped to receive heads 190 within close tolerances so as to not allow heads 190 to rotate within torsion shaft adjustment plate 182. That is, if heads 190 are square, these corresponding openings too are square. In this non-rotational arrangement, if roller assembly 114 encounters a variation in a field, such as a rock or clod of dirt, the roller assembly 114 will spring upward, and the flexing member within torsion shaft 180 will load and allow heads to rotate with respect to shaft 186, thereby providing some flexibility to the system. In addition, the downward position and force can be adjusted by selecting different adjustment openings 178.

A pair of extension arms 192 are connected to shaft 186. Extension arms 192 are formed of any suitable size, shape and design. In one arrangement, as is shown, extension arms have an opening that receives shaft 186 in a non-rotational manner. That is, when shaft 186 is square, these openings are correspondingly square and receive shaft 186 within close tolerances. Extension arms 192 are connected to shaft 186 by any means known in the art, such as welding, fastening or forming the two components out of a single piece of material. These extension arms 192 are positioned in parallel spaced alignment and extend rearward from shaft 186. Extension arms 192 serve in a similar or the same manner to the ends of swing arms 74 described with respect to the third embodiment (FIGS. 11-15). The remaining components of the assembly are similar if not identical to those described with respect to the third embodiment (FIGS. 11-15) and therefore this description will be incorporated herein to avoid redundancy. That is, yokes 110 connect to the rearward end of extension arms 192, in the same manner yokes 110 connect to the rearward end of swing arms 74 in the third embodiment, and the roller assembly 114 is formed in the same manner and connected to the yokes 110 in the same manner as is described with respect to the third embodiment, so on.

In operation, the fourth embodiment, depicted in FIGS. 16-20 is connected to the tube frame 1 of agricultural implement 30 by placing the tool bar 150 in front of a pair of wheels 32 such that the C-shaped or U-shaped opening in the tube frame brackets 154 receive the tube frame 1. In the proper alignment, a pair of linkage arm brackets 162 are positioned on either side of a wheel 32 and corresponding wheel brace 38. Once properly aligned, fasteners are used to tighten tool bar 150 to tube frame 1. In this position, linkage arms 166 are connected at their upper end to linkage arm brackets 162, and at their lower end to the forward end of swing arms 170. Next, the wheel brace mounting plate 174 is fastened to the lower end of the wheel brace 38 and the swing arm 170 is connected to the wheel brace mounting plate 174 by fastener 172. Next, the torsion shaft 180 is inserted within torsion shaft opening 176 of swing arms 170 and the heads 190 are inserted into the openings of collar 184 of torsion shaft adjustment plate 182, which are positioned outside of swing arms 170. Next, the height of the roller assembly 114 is set by fastening the torsion shaft adjustment plate 182 to the appropriate adjustment opening 178 using a conventional fastener. The higher the selected adjustment opening 178, the lower the roller assembly 114 will be positioned; the lower the selected adjustment opening 178, the higher the roller assembly 114 will be positioned.

Figure 17:
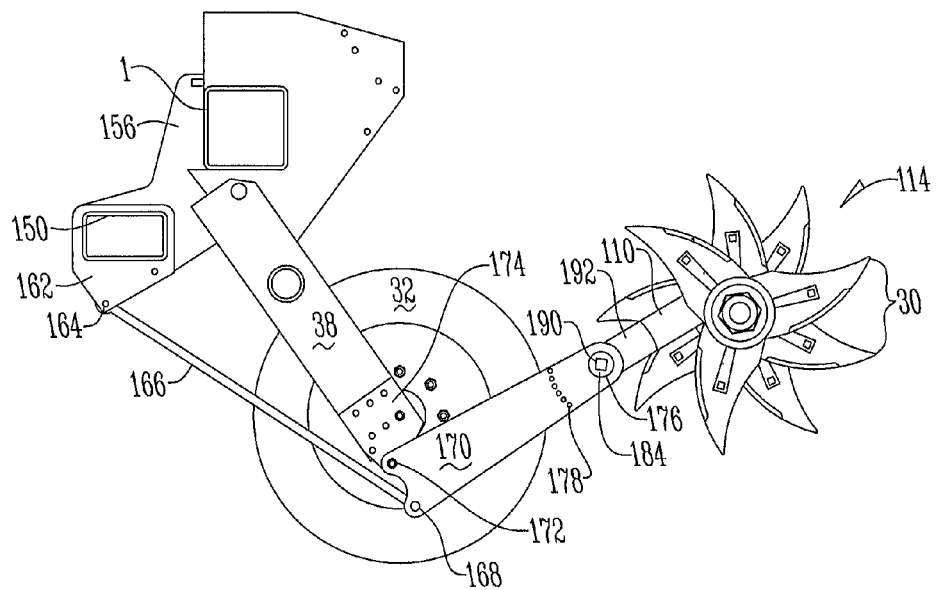
FIG. 17 is a side elevation view of the fourth embodiment shown in FIG. 16, in this view the roller assembly is in a disengaged position.
Figure 18:
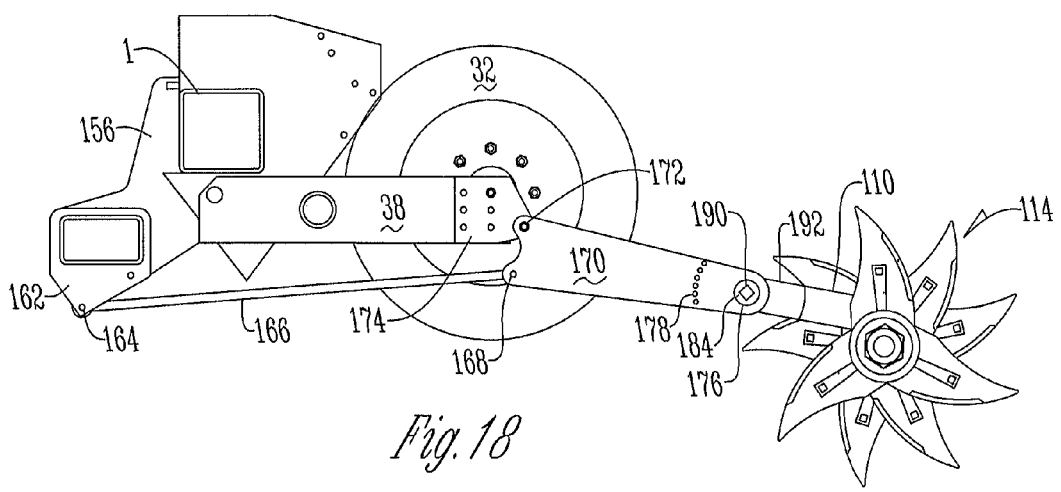
FIG. 18 is a side elevation view of the fourth embodiment shown in FIGS. 16 and 17, in this view the roller assembly is in an engaged position.
Figure 19:
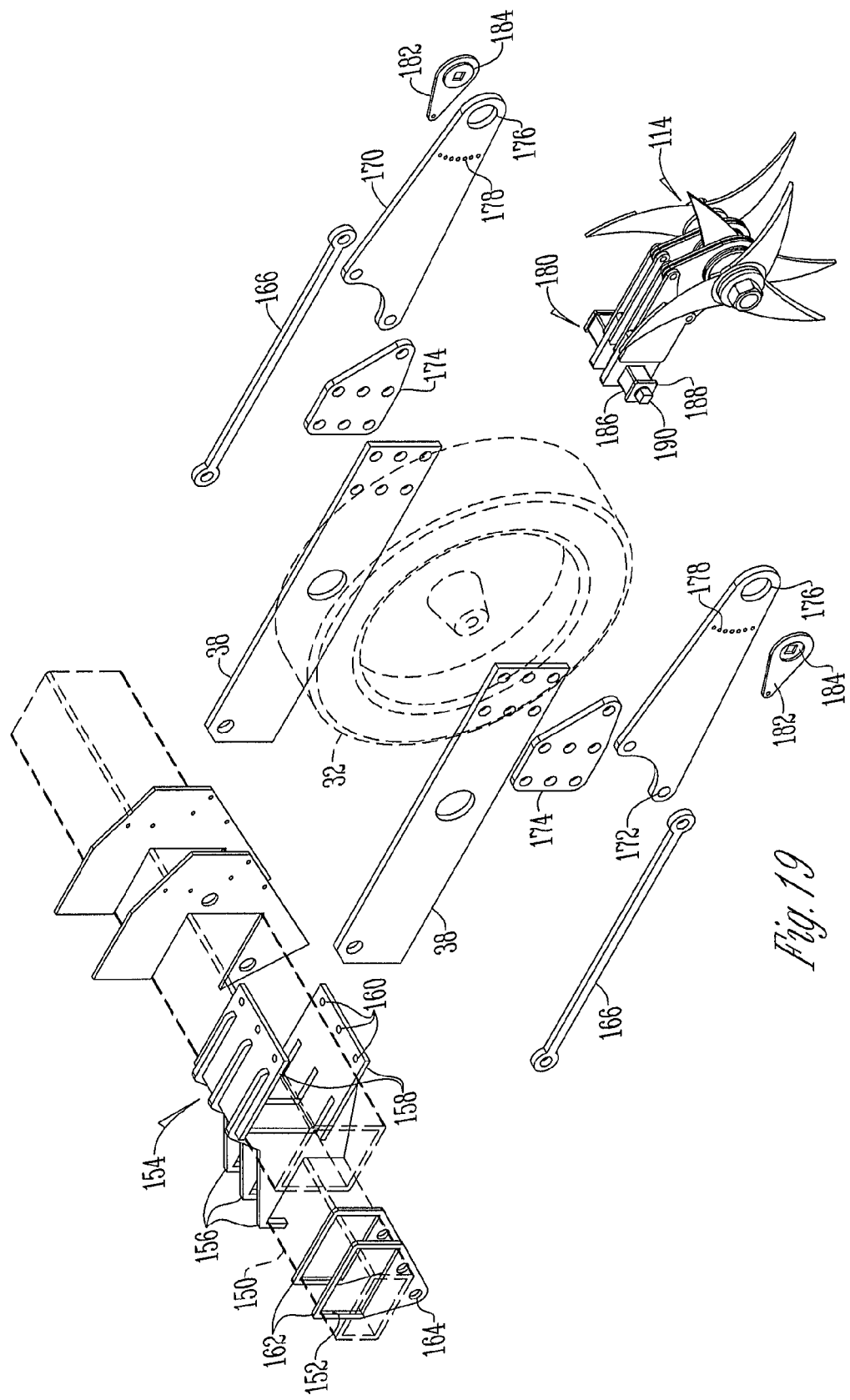
FIG. 19 is an exploded perspective view of the fourth embodiment shown in FIGS. 16-18.
Figure 20:
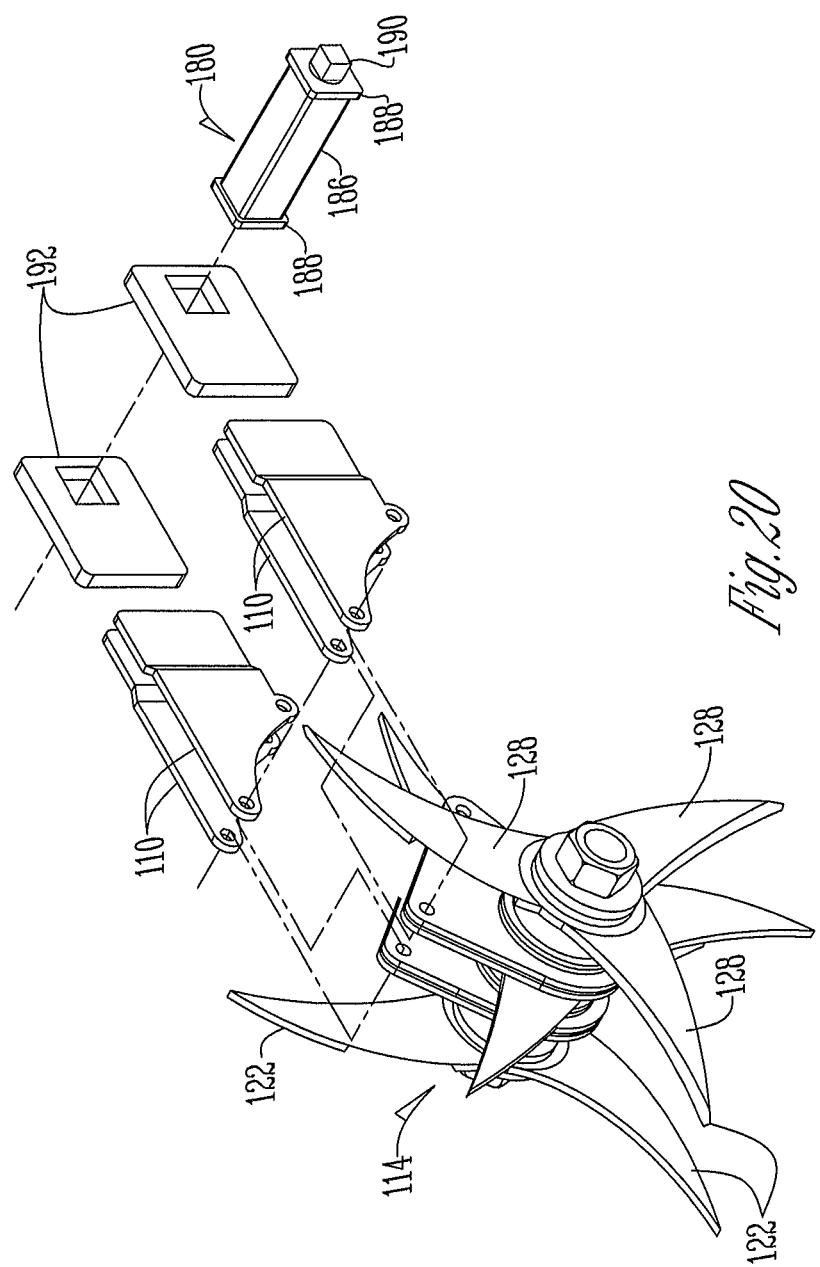
FIG. 20 is an exploded perspective view of the torsion shaft assembly and roller assembly of the fourth embodiment shown in FIGS. 16-19.
Figure 21:
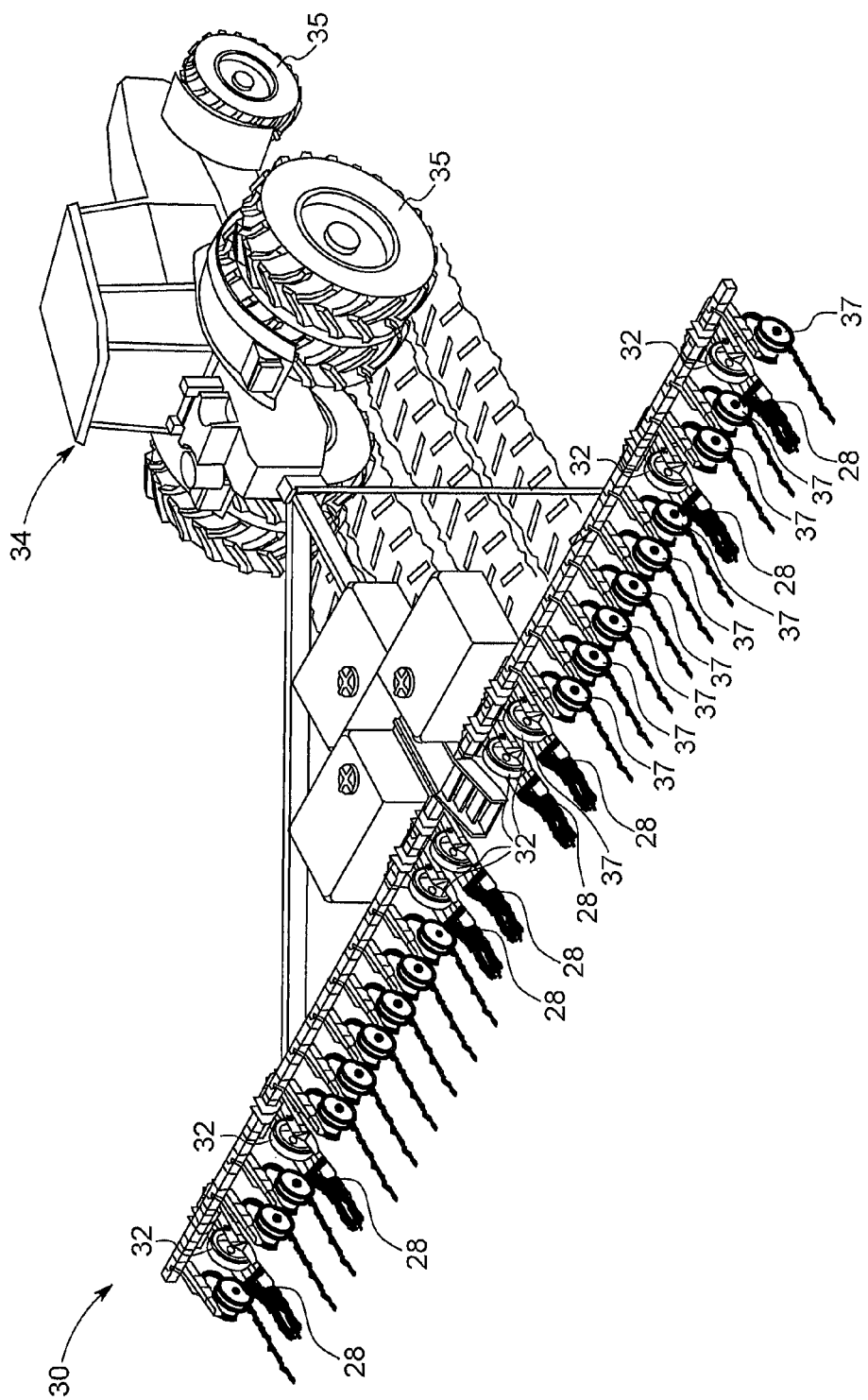
FIG. 21 is a perspective rear view of a tractor pulling an agricultural implement behind the tractor, the agricultural implement having a tillage device positioned in alignment with and behind wheels of the tractor and/or the agricultural implement; in this arrangement the agricultural implement is a planter.
Figure 22:
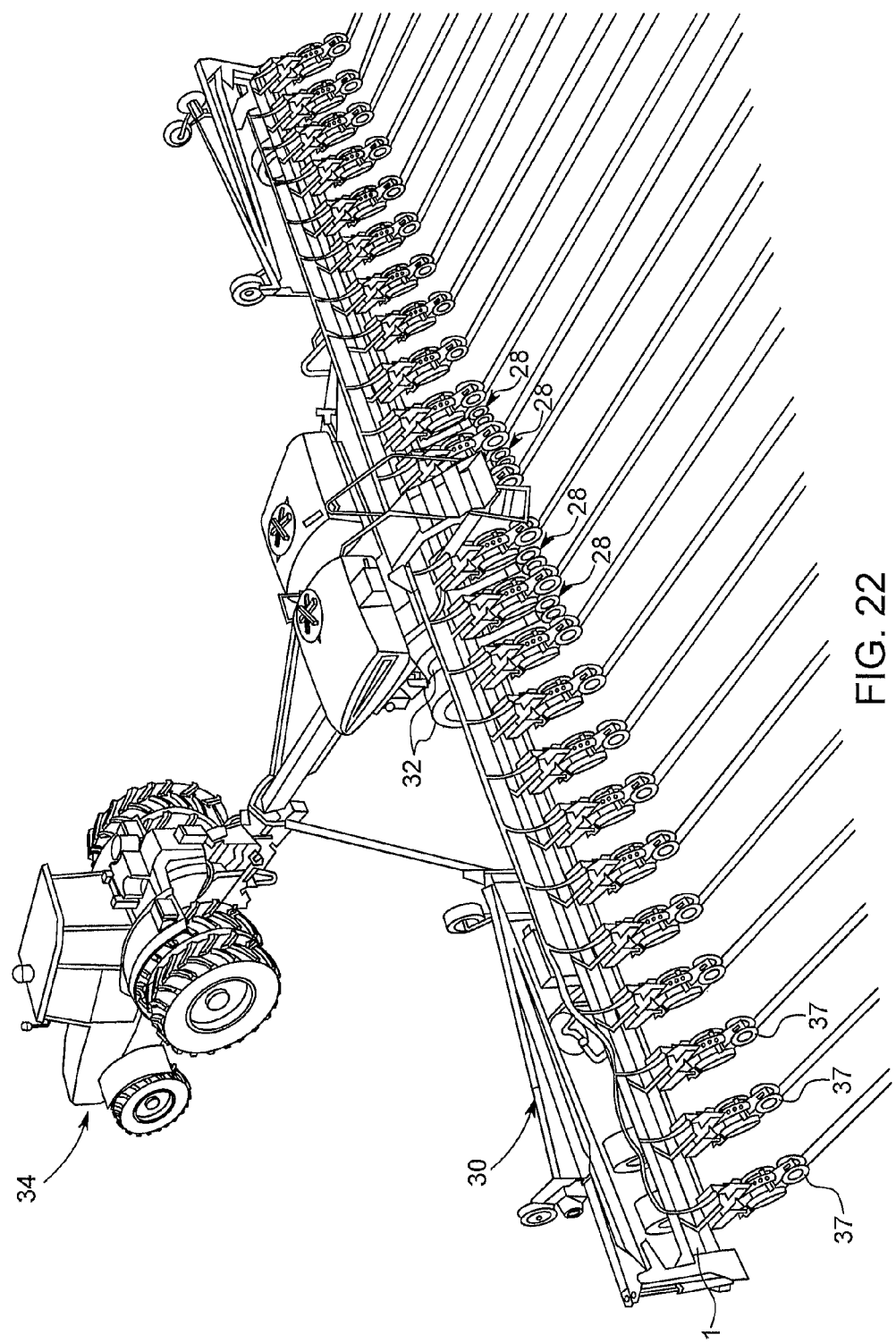
FIG. 22 is a perspective rear view of a tractor pulling an agricultural implement behind the tractor, the agricultural implement having a four tillage devices of the embodiment shown in FIGS. 11-15, the tillage devices positioned in alignment with and behind the weight bearing wheels of the tractor and/or the agricultural implement; in this arrangement the agricultural implement is a planter of a different configuration as that shown in FIG. 21, the tillage devices are attached to the frame of the planter and positioned in alignment behind the wheels positioned below the bulk seed holding containers.

Once fully assembled, the roller assembly 114 moves between a disengaged, or raised position (as is seen in FIG. 17) and an engaged, or lowered position (as is seen in FIG. 18) automatically as the planter moves between a non-planting, or raised position (as is seen in FIG. 17) and a planting, or lowered position (as is seen in FIG. 18). More specifically, as the planter is lowered, the wheel brace 38 and wheel 32 extend rearward. This causes linkage arm 166 to pivot on first linkage arm shaft 164 and second linkage arm shaft 168. As linkage arm 166 pivots, the combined effects of the pivoting wheel brace 38 and linkage arm 166 causes swing arm 170 to move into an engaged position. This forces the tines 128 to engage the soil of the farm field and rotate as the agricultural implement 30 is pulled across the fields.

In the event the user does not want the roller assembly to engage the soil when the planter is in a planting position, the user can select the lower-most adjustment opening 178. In this position, even when the swing arms 170 are fully lowered, the roller assembly 114 will not till the soil.

In an alternative arrangement, an engine or motor is operably connected to the roller assembly 114 and actively powers rotation of the roller assembly 114. This arrangement reduces the torque or horsepower required to pull the agricultural implement 30.

From the above discussion, it will be appreciated that a tillage device for agricultural machinery or implements that reduces compaction caused by wheels in a field has been presented that improves upon the state of the art.

That is, provide a tillage device for agricultural machinery or implements that: is easy to use; can easily be installed on conventional and existing agricultural implements; does not substantially interfere with the use or operation of the agricultural machinery or implements is robust; is simple; does not greatly increase the amount of drag placed on the agricultural implement or greatly increase the amount of torque or horsepower required to operate the agricultural implement; has an intuitive design; is relatively inexpensive; improves plant yield and health; has a long useful life; has a short pay-back period; has a minimum number of parts; can be precisely controlled; is selectively positional between an operable position and an inoperable position; reduces or eliminates the effect of implement weight has on compaction; reduces compaction without requiring additional passes across the field; among countless other features and advantages.

It will be appreciated by those skilled in the art that other various modifications could be made to the device without parting from the spirit and scope of this invention. All such modifications and changes fall within the scope of the claims and are intended to be covered thereby.

What is claimed is:

1. A system for tilling compression marks in soil of a field caused by wheels of a planter, the system comprising:
   a planter;
   the planter having a frame, a first wheel and a plurality of row units;
   wherein the row units are configured to plant seeds in the soil of the field;
   a tilling attachment;
   the tilling attachment operably connected to the frame of the planter;
   the tilling attachment having a first roller assembly;
   the first roller assembly having an axle and at least one blade assembly connected to the axle;
   wherein the roller assembly is positioned between two adjacent row units of the planter;
   wherein the roller assembly is positioned behind the first wheel of the planter such that when the planter moves through the field, the first wheel creates a compression mark in the soil of the field and the first roller assembly rotates and the at least one blade assembly tills a compression mark formed by the first wheel;
   wherein alignment of the roller assembly behind the first wheel and between two adjacent row units allows for tilling of the compression mark formed by the first wheel while leaving areas of the field planted by the row units unaffected by the roller assembly.

* * * * *